(12) United States Patent
Xu

(10) Patent No.: US 12,269,328 B2
(45) Date of Patent: Apr. 8, 2025

(54) LATCHING MECHANISMS FOR TONNEAU COVERS

(71) Applicant: Cixi City Liyuan Auto Parts Co., Ltd, Cixi (CN)

(72) Inventor: Enli Xu, Cixi (CN)

(73) Assignee: Cixi City Liyuan Auto Parts Co., Ltd (CN)

( * ) Notice: Subject to any disclaimer, the term of this patent is extended or adjusted under 35 U.S.C. 154(b) by 233 days.

(21) Appl. No.: 18/172,891

(22) Filed: Feb. 22, 2023

(65) Prior Publication Data

US 2023/0202276 A1   Jun. 29, 2023

Related U.S. Application Data

(63) Continuation-in-part of application No. 17/514,867, filed on Oct. 29, 2021, now Pat. No. 11,780,304,
(Continued)

(30) Foreign Application Priority Data

Aug. 24, 2020 (CN) .......................... 202021779077.0
Aug. 24, 2020 (CN) .......................... 202021779113.3
(Continued)

(51) Int. Cl.
*B60J 7/10* (2006.01)
*B60P 7/04* (2006.01)

(52) U.S. Cl.
CPC ............. *B60J 7/104* (2013.01); *B60P 7/04* (2013.01)

(58) Field of Classification Search
USPC ...................................... 296/100.07, 100.04
See application file for complete search history.

(56) References Cited

U.S. PATENT DOCUMENTS 5,636,893 A    6/1997  Wheatley et al.
6,814,388 B2   11/2004 Wheatley
(Continued)

FOREIGN PATENT DOCUMENTS

CN    206703914    12/2017
CN    207374085     5/2018
(Continued)

OTHER PUBLICATIONS

Notice of Allowance; U.S. Appl. No. 11/186,151 (U.S. Appl. No. 17/171,139); corresponding parent application.
(Continued)

*Primary Examiner* — Joseph D. Pape
(74) *Attorney, Agent, or Firm* — Quarles & Brady LLP

(57) ABSTRACT

A truck cover system comprises a side rail configured to be coupled to a side wall of a bed of a truck; a cover removably attached to the side rail and configured to cover the bed of the truck; a latching mechanism attached to the cover and configured to releasably engage the side rail; and a driving assembly configured to drive the latching mechanism. The driving assembly comprises a mount plate coupled with the side rail through a latch attachment; a driving cylinder rotatably coupled with the mount plate; a driving ring releasably coupled with the driving cylinder and configured to rotate together with the driving cylinder; a torsion spring interposed between the driving ring and the mount plate and configured to be driven by the driving ring; and a handle coupled with the driving cylinder and configured to rotate together with the driving cylinder and the driving ring.

20 Claims, 19 Drawing Sheets

Related U.S. Application Data which is a continuation of application No. 17/171,139, filed on Feb. 9, 2021, now Pat. No. 11,186,151.

(30) Foreign Application Priority Data

| Aug. 24, 2020 | (CN) | 202021780483.9 |
| Feb. 25, 2022 | (CN) | 202220421758.2 |

(56) References Cited

U.S. PATENT DOCUMENTS

| 7,188,888 | B2 | 3/2007 | Wheatley et al. |
| 7,484,788 | B2 | 2/2009 | Calder et al. |
| 7,604,282 | B2 | 10/2009 | Spencer et al. |
| D620,877 | S | 8/2010 | Rusher et al. |
| 8,061,758 | B2 | 11/2011 | Maimin et al. |
| 8,182,021 | B2 | 5/2012 | Maimin et al. |
| 8,585,120 | B2 | 11/2013 | Rusher et al. |
| 8,690,224 | B2 | 8/2014 | Maimin et al. |
| 9,421,850 | B2 | 8/2016 | Shi et al. |
| 10,189,339 | B2 | 1/2019 | Williamson et al. |
| 10,189,340 | B2 | 1/2019 | Schmeichel et al. |
| 10,384,522 | B2 | 8/2019 | Yilma et al. |
| 10,471,879 | B1 | 11/2019 | Copp et al. |
| 10,875,391 | B2 | 12/2020 | Facchinello et al. |
| 11,351,846 | B2 * | 6/2022 | Schollhammer ......... B60J 7/198 |
| 11,446,995 | B2 * | 9/2022 | Dylewski, II ............ B60J 7/198 |
| 2014/0312645 | A1 | 10/2014 | Maimin |
| 2015/0123421 | A1 | 5/2015 | Combs, II et al. |
| 2018/0118007 | A1 | 5/2018 | Facchinello |

FOREIGN PATENT DOCUMENTS

| CN | 208530247 | 2/2019 |
| CN | 208530707 | 2/2019 |
| CN | 208633713 | 3/2019 |
| CN | 208881559 | 5/2019 |
| CN | 212073636 | 4/2020 |
| CN | 210436990 | 5/2020 |
| CN | 210554111 | 5/2020 |
| CN | 210821776 | 6/2020 |

OTHER PUBLICATIONS

IDS substitute Sheet for form 144B for U.S. Appl. No. 11/186,151 (U.S. Appl. No. 17/171,139); corresponding parent application.

IDS or U.S. Appl. No. 11/186,151 (U.S. Appl. No. 17/171,139); corresponding parent application.

Non Final Office Action issued Mar. 30, 2121 for U.S. Appl. No. 17/176,363 for related case.

* cited by examiner

LATCHING MECHANISMS FOR TONNEAU COVERS

CROSS-REFERENCE TO RELATED PATENT APPLICATIONS

This application is a continuation-in-part of U.S. patent application Ser. No. 17/514,867, filed on Oct. 29, 2021, which is a continuation to U.S. patent application Ser. No. 17/171,139, filed on Feb. 9, 2021, which claims the benefit of Chinese Patent Application No. CN202021779077.0, filed on Aug. 24, 2020, Chinese Patent Application No. CN202021779113.3 filed on Aug. 24, 2020, and Chinese Patent Application No. CN 202021780483.9, filed on Aug. 24, 2020. This application also claims priority to Chinese Patent Application No. 202220421758.2, filed on Feb. 25, 2022. The entire contents of aforementioned applications are incorporated herein by reference in their entireties for all purposes.

FIELD

The present disclosure relates, in general, to methods, systems, and apparatuses for implementing a tonneau cover.

BACKGROUND

Traditionally, truck cover systems are often used to protect cargo beds of pickup trucks. Cover systems often cover all or a portion of the cargo bed of the truck such that any items stored and/or hauled in the cargo bed are protected from outside elements and theft. Many conventional cover systems are releasably latched at the tailgate to a side rail of the truck to keep the cover closed. To facilitate access to the cargo bed, the latching structure of the cover system may be easily released. Conventional latching structures for these cover systems involve many inadequacies.

Hence, there is a need for more robust and scalable solutions for implementing methods, systems, and apparatus for implementing a tonneau cover, and more particularly, to methods, systems, and apparatus for implementing a latching system for a tonneau cover.

BRIEF SUMMARY OF THE INVENTION

The present disclosure is directed to truck cover systems. One general aspect of certain embodiments provides a truck cover system, which includes a side rail for mounting to a side wall of a truck bed, a first connection plate disengageably coupled to and extending from the side rail, a second connection plate disengageably coupled to the first bottom surface of the first connection plate, a cover removably accoupled to the second connection plate, a connector disengageably coupled the cover to the first connection plate and the second connection plate, a latching mechanism coupled to the cover and configured to releasably engage with a second bottom surface of the second connection plate. The side rail includes a first top surface, a side surface configured as an angled surface, and a first inner surface configured substantially in parallel with the side wall of the bed of the truck. The first connection plate includes a first recess on a first bottom surface of the first connection plate and a second recess on a second top surface of the first connection plate. The second connection plate includes a first protrusion on a third top surface of the second connection plate and a third recess on the third top surface of the second connection plate. The first protrusion is positioned within the first recess in an engaged position. The connector includes a first prong and a second prong.

According to another embodiment, the first recess of the first connection plate and the first protrusion of the second connection plate are T-shaped.

According to yet another embodiment, the first prong of the connector releasably engages with the second recess of the first connection plate, and the second prong of the connector releasably engages with the third recess of the second connection plate.

According to yet another embodiment, the connector further includes a gap located above the first connection plate and below the cover. The gap causes the second connection plate to bear the weight of the cover.

According to yet another embodiment, the second connection plate further includes a second inner surface configured in parallel with the side wall of the bed of the truck, and one or more first grooves located on the second inner surface of the second connection plate.

According to yet another embodiment, the truck cover system further includes a clamp configured to clamp a second inner surface of the second connection plate and the side wall of the bed of the truck together.

According to yet another embodiment, when the cover is closed, an upper surface of the connector releasably engages with and/or snaps into a bottom surface of the cover.

Another general aspect of certain embodiments includes a truck cover system, which includes a side rail configured to be coupled to a side wall of a bed of a truck, a cover removably attached to the side rail and configured to cover the bed of the truck, and a latching mechanism. The latching mechanism includes a latch housing attached to the cover and having a first open end and a second end, a latch extending through the first open end of the latch housing and configured to releasably engage with a bottom portion of the side rail, a cap having an opening and attached to the second end of the latch housing, a plunger attached to the latch and having a first plunger end partially extending through the opening of the cap, an anchor element attached to the first plunger end of the plunger and configured to stop the first plunger end from entering the latch housing, and a spring wrapped around the plunger. A first spring end of the spring is in contact with an interior surface of the cap. When the spring is compressed, the latch disengages with the bottom portion of the side rail. When the spring is uncompressed the latch engages with the bottom portion of the side rail latching the cover in place.

According to another embodiment, the latch is attached to the plunger via a threaded connection.

According to yet another embodiment, a bottom surface of the latch is angled.

According to yet another embodiment, the anchor element includes a slot extending through the anchor element and a cord extends through the slot of the anchor element. The cord is inserted through the slot of the anchor element to create a loop and the loop is tied via one or more attachment elements. Pulling on the cord causes the plunger to move toward the cap of the housing, then causes the spring to compress, and thus cause the latch to disengage with the bottom portion of the side rail. Releasing the cord causes the plunger to move away from the cap of the housing, then causes the spring to decompress, and thus causes the latch to engage with the bottom portion of the side rail.

According to yet another embodiment, a first segment of the cord is threaded through the cover.

Yet another general aspect of certain embodiments includes a truck cover system, which includes a side rail configured to be coupled to a side wall of a bed of a truck, a first connection plate attached to and extending from the side rail, a second connection plate removably coupled to the first bottom surface of the first connection plate, a cover removably attached to the second connection plate and configured to cover the bed of the truck, a connector configured to removably couple the cover to the first connection plate and the second connection plate, and a latching mechanism attached to the cover. The side rail includes a first top surface, a side surface configured as an angled surface, and a first interior surface. The first connection plate includes a first recess on a first bottom surface of the first connection plate, and a second recess on a second top surface of the first connection plate. The second connection plate includes a first protrusion on a third top surface of the second connection plate, and a third recess on the third top surface of the second connection plate. The connector includes a first prong and a second prong.

According to another embodiment, the latching mechanism includes a latch housing attached to the cover and having a first open end and a second end, a latch extending through the first open end of the latch housing and configured to releasably engage with a bottom portion of the second connection plate, a cap having an opening and attached to the second end of the latch housing, a plunger attached to the latch and having a first plunger end partially extending through the opening of the cap, an anchor element attached to the first plunger end of the plunger and configured to stop the first plunger end from entering the latch housing, and a spring wrapped around the plunger. A first spring end of the spring is in contact with an interior surface of the cap. When the spring is compressed, the latch disengages with the bottom portion of the second connection plate. When the spring is uncompressed, the latch engages with the bottom portion of the second connection plate latching the cover in place.

According to yet another embodiment, the latching mechanism is configured to releasably engage with the bottom portion of the second connection plate. A second bottom surface of the latch is angled and the third top surface of the second connection plate is angled. Pulling on the cord causes the plunger to move toward the cap of the latch housing, causes the spring to compress, and causes the latch to disengage with the bottom portion of the second connection plate. Releasing the cord causes the plunger to move away from the cap of the latch housing, causes the spring to decompress, and causes the latch to engage with the bottom portion of the second connection plate.

According to yet another embodiment, the first prong of the connector releasably engages with the second recess of the first connection plate, and the second prong of the connector releasably engages with the third recess of the second connection plate. The connector further includes a gap located above the first connection plate and below the cover, and the gap causes the second connection plate to bear the weight of the cover.

Another general aspect of certain embodiments includes A truck cover system, comprising: a side rail configured to be coupled to a side wall of a bed of a truck; a cover removably attached to the side rail and configured to cover the bed of the truck; a latching mechanism attached to the cover and configured to releasably engage the side rail; and a driving assembly configured to drive the latching mechanism, the driving assembly comprising: a mount plate coupled with the side rail through a latch attachment; a driving cylinder rotatably coupled with the mount plate; a driving ring releasably coupled with the driving cylinder and configured to rotate together with the driving cylinder; a torsion spring interposed between the driving ring and the mount plate and configured to be driven by the driving ring; and a handle coupled with the driving cylinder and configured to rotate together with the driving cylinder and the driving ring.

According to some embodiments of the present disclosure, the driving assembly further comprises a cover frame coupled with the mount plate and the latch attachment.

According to some embodiments of the present disclosure, the driving cylinder comprises a cylinder flange and a cylinder body coupled with the flange, wherein the mount plate comprises a central hole, wherein the cylinder body of the driving cylinder is inserted through the central hole.

According to some embodiments of the present disclosure, mount plate further comprises a recess formed in a bottom surface of the mount plate and surrounding the central hole, wherein the flange of the driving cylinder is received within the recess.

According to some embodiments of the present disclosure, the mount plate further comprises a mount flange extending perpendicular to the mount plate around the central hole in the mount plate, wherein the torsion spring passes through the mount flange of the mount plate.

According to some embodiments of the present disclosure, the driving cylinder comprises a slot formed longitudinally in the cylinder body of the driving cylinder, wherein the driving ring is coupled to the slot.

According to some embodiments of the present disclosure, the driving cylinder comprises a shoulder formed in the cylinder body.

According to some embodiments of the present disclosure, the driving ring comprises a tab extending radially inwards from an inner rim of the driving ring, wherein the tab is received within the slot of the driving cylinder.

According to some embodiments of the present disclosure, the driving cylinder comprises a first slot and second slot formed longitudinally in the cylinder body of the driving cylinder, wherein the first slot and the second slot are diametrically formed around the cylinder body, wherein the driving ring coupled to the first and second slots.

According to some embodiments of the present disclosure, the driving ring comprises a first tab and a second tab extending radially inwards from an inner rim of the driving ring, wherein the first tab and the second tab are diametrically formed around the inner rim of the driving ring, wherein the driving cylinder comprises a first slot and a second slot formed longitudinally in the cylinder body of the driving cylinder, wherein the first slot and the second slot are diametrically formed around the cylinder body, wherein the first tab is received within the first slot and the second tab is received within the second slot.

According to some embodiments of the present disclosure, the driving ring further comprises an ear extending radially outward from an outer rim of the driving ring, wherein the latching mechanism is releasably coupled with the ear of the driving ring.

According to some embodiments of the present disclosure, the driving ring further comprises a driving arm coupled with the ear of the driving ring and extending perpendicular to the driving ring, wherein the torsion spring comprises a first leg and a second leg, wherein the driving arm of the driving ring is disposed between the first leg and the second leg of the torsion spring.

According to some embodiments of the present disclosure, the mount plate further comprises a location pin extending perpendicular to the mount plate, wherein the location pin is disposed between the first leg and the second leg of the torsion spring.

According to some embodiments of the present disclosure, the mount plate further comprises stop pin extending perpendicular to the mount plate, wherein the stop pin is configured to limit an angle rotated by the driving ring.

According to some embodiments of the present disclosure, the driving ring further comprises a first ear and a second ear extending radially outward from an outer rim of the driving ring, wherein the first ear and the second ear are formed diametrically around the outer rim of the driving ring, wherein the latching mechanism is releasably coupled with the first ear of the driving ring and another latching mechanism is releasably coupled with the second ear of the driving ring.

According to some embodiments of the present disclosure, the driving ring further comprises a driving arm coupled with the first ear of the driving ring and extending perpendicular to the driving ring, wherein the torsion spring comprises a first leg and a second leg, wherein the driving arm of the driving ring is disposed between the first leg and the second leg of the torsion spring.

According to some embodiments of the present disclosure, the mount plate further comprises a location pin extending perpendicular to the mount plate, wherein the location pin is disposed between the first leg and the second leg of the torsion spring.

According to some embodiments of the present disclosure, the mount plate further comprises a first stop pin and a second stop pin extending perpendicular to the mount plate, wherein the first stop pin and the second stop pin are diametrically disposed around the driving ring, wherein the first stop pin and the second stop pin are configured to limit an angle rotated by the driving ring.

According to some embodiments of the present disclosure, the handle comprises a cylinder portion formed at an end thereof and extending perpendicular to a main body of the handle, wherein a distal end of the cylinder portion rests against the driving ring.

According to some embodiments of the present disclosure, the handle further comprises a handle hole formed through the cylinder portion of the handle, wherein the handle further comprises a protrusion formed longitudinally in the handle hole, wherein the protrusion is configured to engage with the driving cylinder.

It is to be appreciated that embodiments of the present disclosure provides many advantages over conventional techniques. Among other things, embodiments provide a truck cover system that can improve the releasable latching of the cover with the side rail. For some embodiments, the addition and operation of the plunger within the latch housing can ensure the latch properly aligns with the side rail to latch the cover in a closed position. Further, by wrapping the spring around the plunger, the spring can more effectively maintain its shape and will not deform.

The present disclosure achieves these benefits and others in the context of known technology. However, a further understanding of the nature and advantages of the present disclosure may be realized by reference to the latter portions of the specification and attached drawings.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
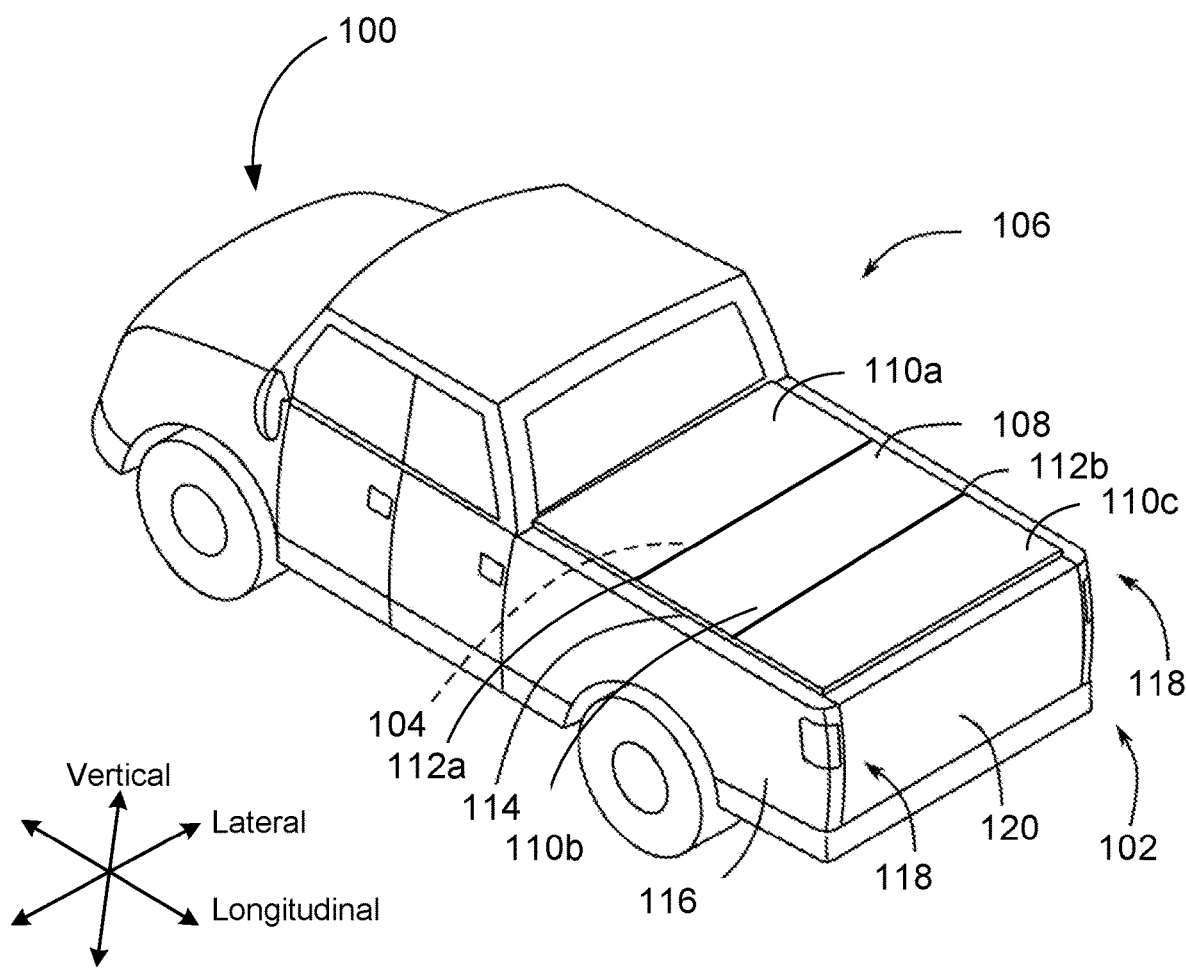
FIG. 1 is a perspective view of an embodiment of a truck with a cover system, in accordance with various embodiments.

Various embodiments provide tools and techniques for implementing a Tonneau cover, and more particularly, for implementing a latching system for a Tonneau cover.

For example, a truck cover system may be implemented. The truck cover system might include a side rail configured to be coupled to a side wall of a bed of a truck, a cover removably attached to the side rail and configured to cover the bed of the truck, and a latching mechanism. The latching mechanism might include a latch housing attached to the cover and having a first open end and a second end, a latch extending through the first open end of the latch housing and configured to releasably engage with a bottom portion of the side rail, a cap having an opening and attached to the second end of the latch housing, a plunger attached to the latch and having a first plunger end partially extending through the opening of the cap, an anchor element attached to the first plunger end of the plunger and configured to stop the first plunger end from entering the latch housing, and a spring wrapped around the plunger and attached to the plunger. A first spring end of the spring may be in contact with an interior surface of the cap. When the spring is compressed, the latch may disengage with the bottom portion of the side rail, and when the spring is uncompressed the latch may engage with the bottom portion of the side rail latching the cover in place.

Various uses or implementations may be made to the various embodiments and examples without departing from the scope of the invention. For example, while the embodiments described above refer to particular features or particular uses, the scope of this invention also includes embodiments having different combination of features or uses, and the embodiments that do not include all of the above described features.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present disclosure may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

We now turn to the embodiments as illustrated by the drawings. FIGS. 1-7 illustrate some of the features of the method, system, and apparatus for implementing a Tonneau cover, and more particularly, to methods, systems, and apparatus for implementing a latching system for a Tonneau cover, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments. Further, the various components of the figures are merely illustrative and are not intended to be to scale.

With reference to the figures, FIG. 1 is a perspective view of an embodiment of a truck 100 with a truck cover system 102, in accordance with various embodiments. As illustrated, the cover system 102 covers the compartment 104 formed by a truck bed 106 to protect an interior of the truck bed 106 and items that may be stored in the compartment 104. For example, the cover system 102 may block dirt and precipitation from entering the truck bed 106.

The cover system 102 includes a cover 108 that extends over the compartment 104. The cover 108 may be flexible. The cover 108 may include one or more panels 110*a*, 110*b*, and/or 110*c*. Although three panels 110*a*, 110*b*, and/or 110*c* (collectively, panels 110) are shown in FIG. 1, the cover 108 may include more than or less than three panels 110. The cover 108 may be configured to flex or bend at the borders 112*a* and/or 112*b* of the panels 110*a*, 110*b*, and 110*c*. Additionally and/or alternatively, the cover 108 may be configured to bend or flex at locations other than the borders 112*a* and/or 112*b*. The cover 108 may be made out of a variety of materials including fabric, plastic (e.g., vinyl), rubber, etc.

The cover 108 couples to the truck bed 106 with side rails 114 that in turn couple to truck side walls 116 (e.g., truck bed walls). To block removal of the cover 108 and/or access to the truck bed 106, the cover system 102 includes one or more latching mechanisms (not shown in FIG. 1). Arrows 118 indicate one or more possible locations for the one or more latching mechanisms. For example, the cover system 102 may include two latching mechanism one at each corner of the truck bed 106 next to the tailgate 120. In operation, the latch systems couple to the side rails 114 to tension/pull the cover 108 into an extended position (e.g., tensioned configuration) that facilitates the flow of precipitation off of the cover system 102 as well as enhancing the aesthetic appearance of the cover system 102.

Figure 2:
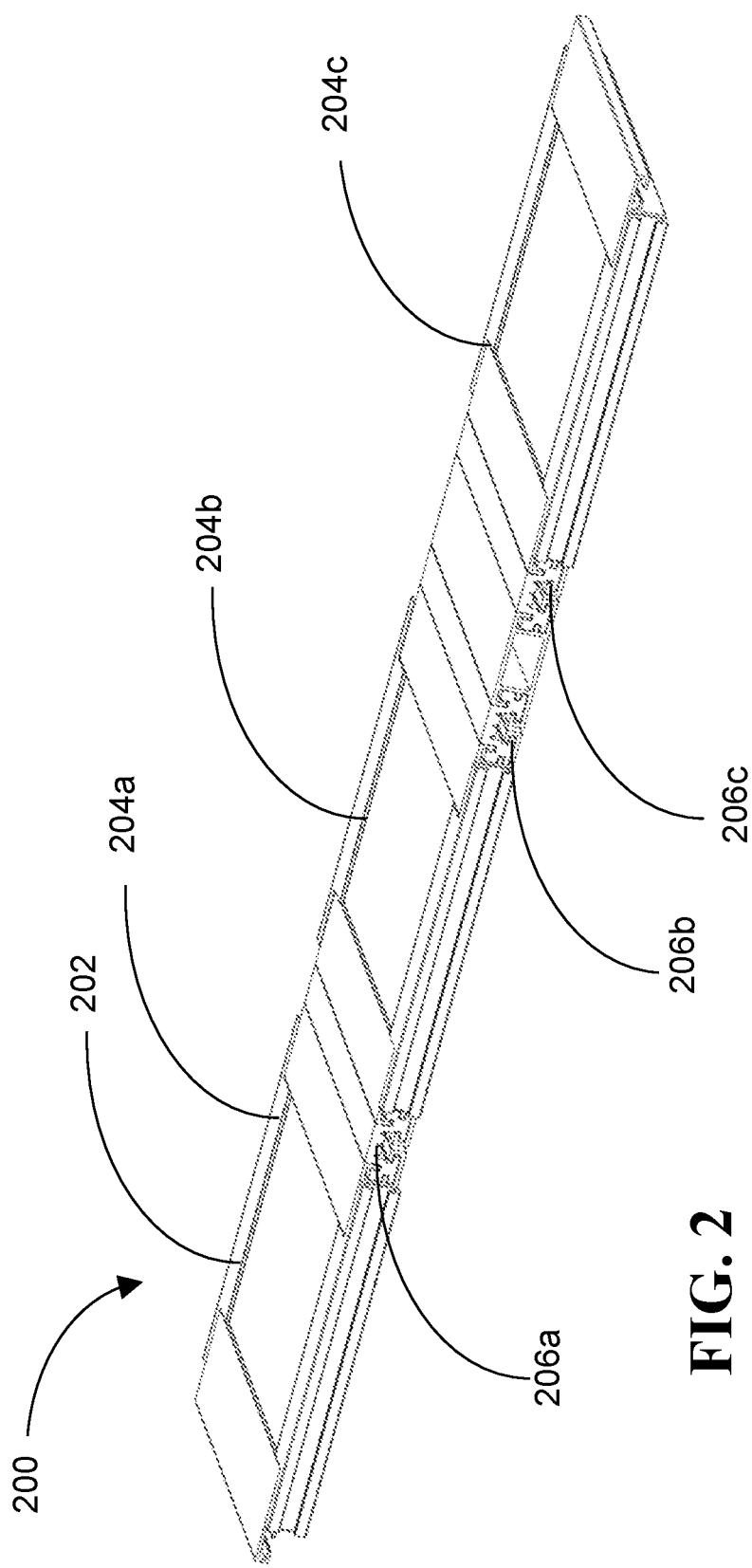
FIG. 2 is a perspective view of a cover system 200, in accordance with various embodiments.

FIG. 2 is a perspective view of a cover system 200, in accordance with various embodiments. The cover system 200 may be similar to the cover system 102 shown in FIG. 1.

Cover system 200 may comprise a cover 202 including one or more panels 204*a*, 204*b*, and/or 204*c* (collectively, panels 204). The one or more panels 204 may be formed from a flexible material. The flexible material may include fabric, plastic (e.g., vinyl), rubber, etc. Although three panels 204 are shown in FIG. 2, the cover 200 may include more than or less than three panels.

The one or more panels 204 may connected to each other via one or more hinges 206a, 206b, and/or 206c (collectively, hinges 206). The hinges 206 may be formed from a flexible material. The flexible material may include fabric, plastic (e.g., vinyl), rubber, etc. The cover 202 may be configured to bend at the one or more hinges 206. In a non-limiting example, a user may bend the cover 202 and the one or more hinges 206 to access the bed of the truck.

Figure 3A:
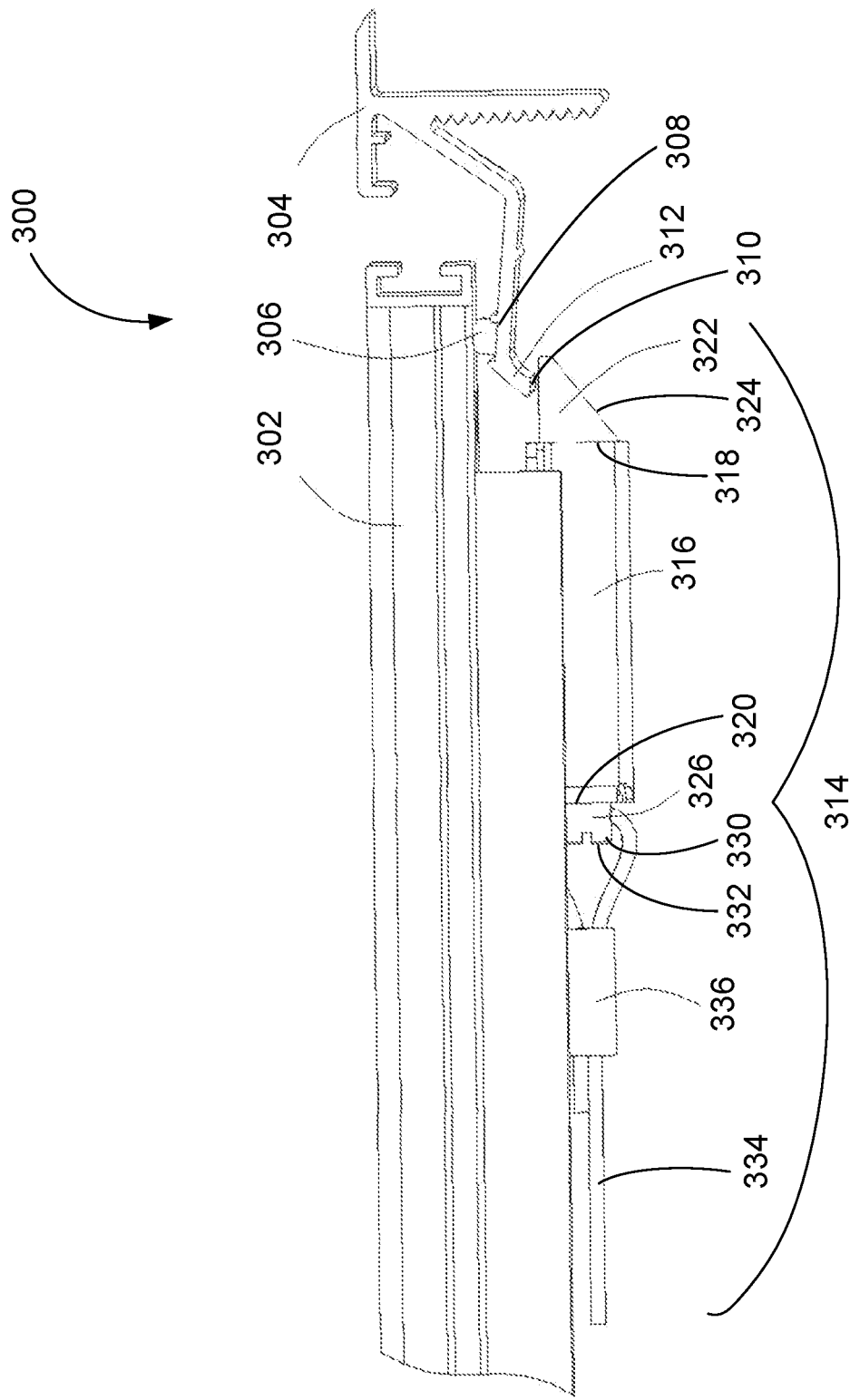
FIG. 3A is a partial front view of a cover system with a latching mechanism, in accordance with various embodiments.
Figure 3B:
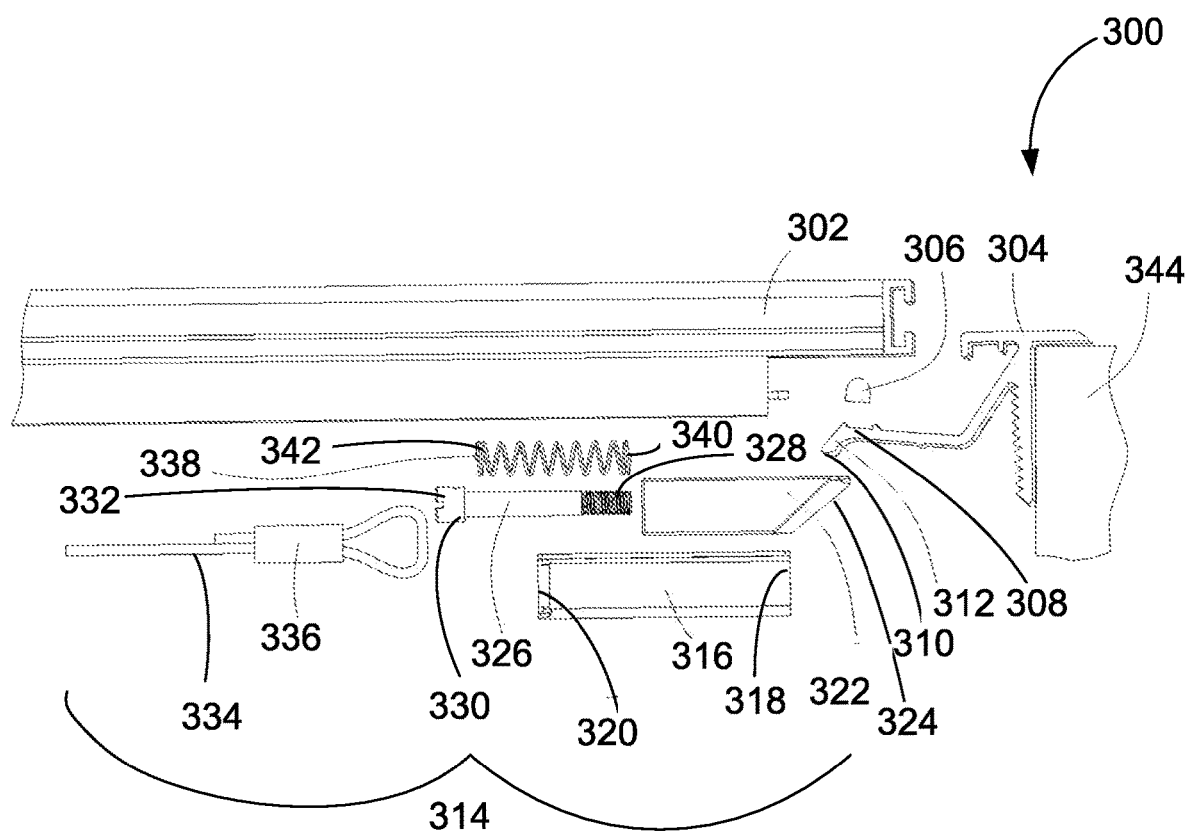
FIG. 3B is an exploded view of the cover system with the latching mechanism from FIG. 3A, in accordance with various embodiments.

FIG. 3A is a partial front view of a cover system 300 with a latching mechanism 314, in accordance with various embodiments. FIG. 3B is an exploded view of the cover system 300 with the latching mechanism 314 from FIG. 3A, in accordance with various embodiments. The cover system 300 may be similar to the cover system 102 shown in FIG. 1 and/or the cover system 200 shown in FIG. 2.

The cover system 300 might include a cover 302 and a side rail 304. The cover 302 might cover a bed of a truck and protect the bed of the truck. The cover 302 might include a connector 306 attached to the cover 302. The side rail 304 might be coupled to a side wall 344 of the bed of the truck. The side rail 304 might include a recess 308, a bottom portion and/or surface 310, and a sloped and/or angled end surface 312.

The connector 306 might releasably and/or removably attach the cover 302 to the side rail 304. The connector 306 might be received in the recess 308 of the side rail 304. The connector 306 might snap into the recess 308 when the cover 302 is closed and might snap out of the recess 308 when the cover 302 is opened. The connector 306 might be formed from a flexible material that has the ability to bend with the cover 302. The flexible material might include fabric, plastic (e.g., vinyl), rubber, etc.

The cover system 300 might further include a latching mechanism 314. The latching mechanism 314 might be located on one side of the truck bed. Additionally and/or alternatively, there may be two latching mechanisms 314 located on each side of the truck bed.

The latching mechanism 314 might include a latch housing 316 attached to the cover 302. The latch housing 316 might have a first open end 318 and a second end 320. The latching mechanism 314 might further include a latch 322 extending through the first open end 318 of the latch housing 316. The latch 322 might be configured to releasably engage with a bottom portion 310 of the side rail 304. The latch 322 might have a sloped and/or angled surface 324.

In some cases, the second end 320 of the housing 316 might have a smaller open end than the first open end 318 of the housing 316. The latching mechanism 314 might further comprise a cap (not shown) restricting the second end 320 of the housing. The cap may have an opening that is smaller than the first open end 318 of the latch housing 316.

The latching mechanism 314 might additionally include a plunger 326 attached to the latch 322. The plunger 326 might be attached to the latch 322 via a threaded connection 328. A first plunger end 330 might partially extend through an opening of the cap. An anchor element 332 might be attached to the first plunger end 330 of the plunger 326 and might be configured to stop the first plunger end 330 from entering the latch housing 316 through the opening of the cap.

A cord 334 might loop and extend through a slot of the first plunger end 330 and/or anchor element 332. Two ends of the looped cord 334 might be attached together via one or more attachment mechanisms 336.

The latching mechanism 314 might also include a spring 338. The spring 338 might be wrapped around the plunger 326. In some cases, a first end 340 of the spring 338 might be attached to the plunger 326. A second end 342 of the spring may be in contact with an interior surface of the second end 320 of the housing 316 and/or an interior surface of the cap.

In operation, in order to open the cover 302, a user of the cover 302 may pull the cord 334 which pulls the plunger 326 further out of the second end 320 of the housing 316 and/or out of the opening of the cap, compresses the spring 338, and pulls the latch 322 into the open end 318 of the housing 316 causing the latch 322 to disengage with the bottom surface 310 of the side rail 304. In order to close the cover 302, the user of the cover 302 may push the cover down causing the connector 306 to releasably engage with the recess 308, causing the sloped surface 324 of the latch 322 to slide along the sloped surface 312 of the side rail 304, pushing the latch 322 toward the second end of the housing 320, and compressing the spring 338. Once the sloped surface 324 of the latch 322 clears the sloped surface 312 of the side rail 304, the spring uncompresses pushing the latch 322 outward and away from the second end of the housing 320 and enabling the latch 322 to releasably engage with the bottom surface 310 of the side rail 304.

The latching mechanism 314 will further be described below with respect to FIGS. 6 and 7.

Figure 4A:
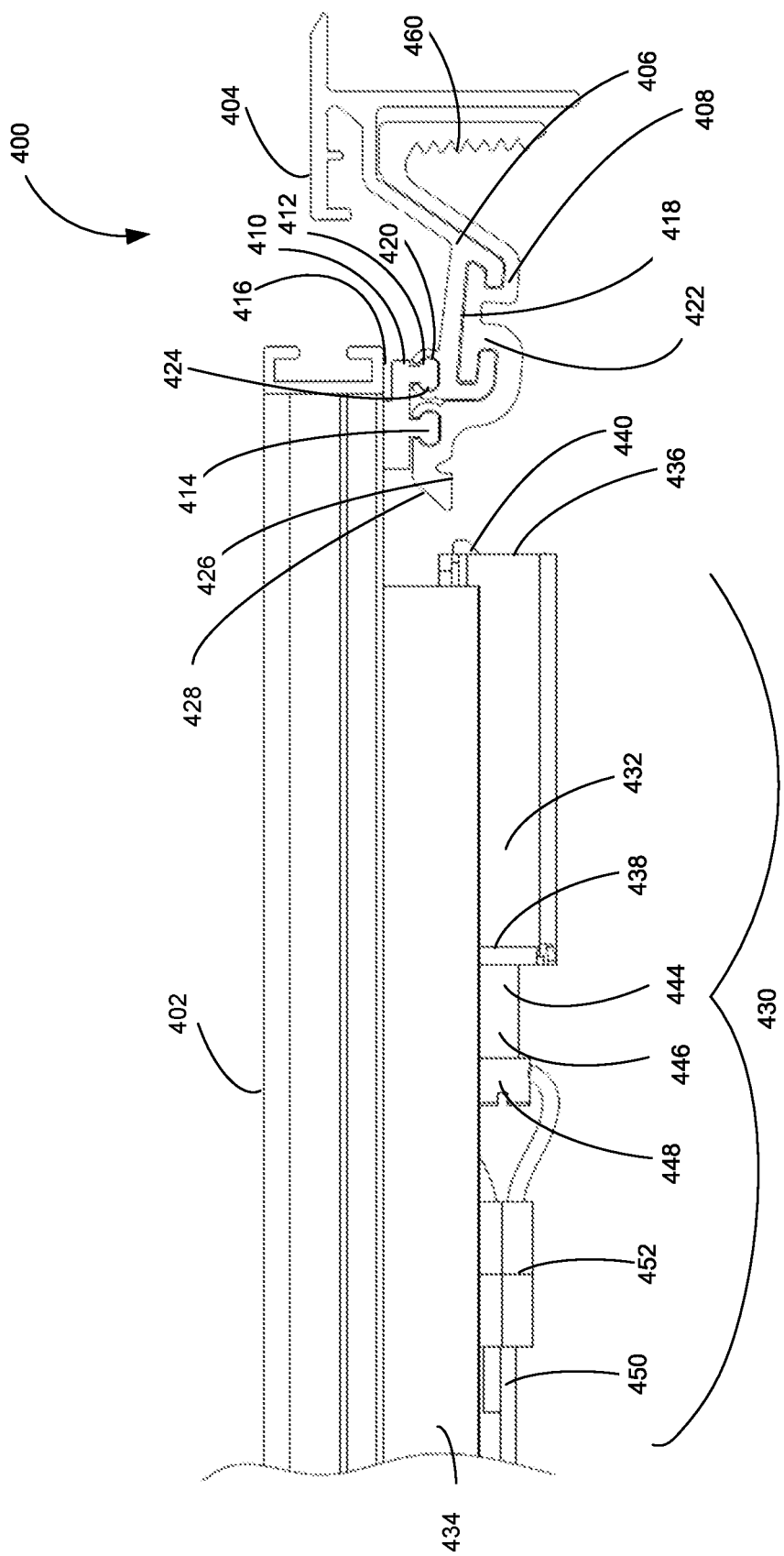
FIG. 4A is a partial front view of a cover system with a latching mechanism in an unlocked position, in accordance with various embodiments.
Figure 4B:
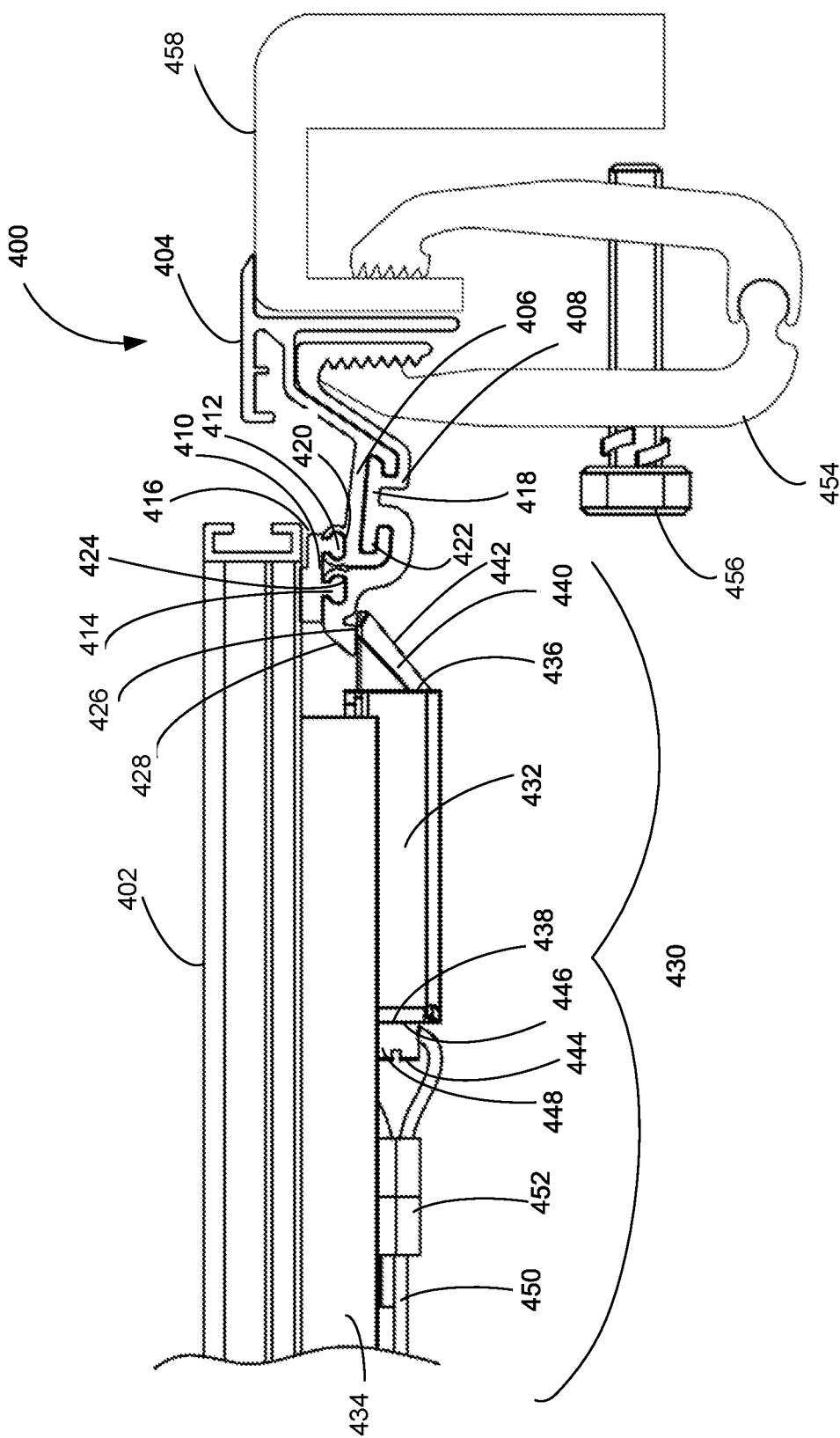
FIG. 4B is a partial front view of a cover system with a latching mechanism in a locked position, in accordance with various embodiments.
Figure 4C:
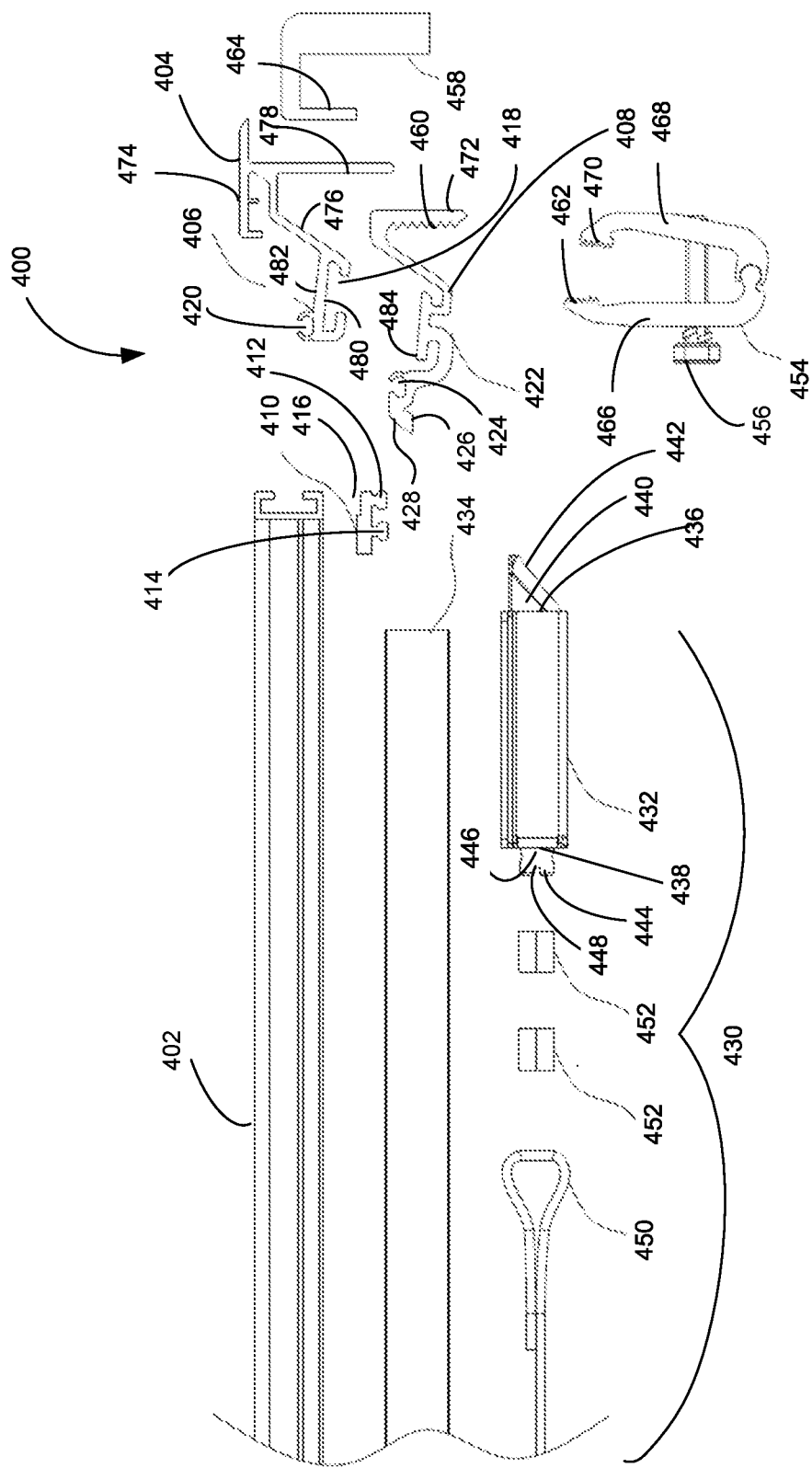
FIG. 4C is an exploded view of the cover system with the latching mechanism from FIGS. 4A and 4B, in accordance with various embodiments.

FIG. 4A is a partial front view of a cover system 400 with a latching mechanism 430 in an unlocked position, in accordance with various embodiments. FIG. 4B is a partial front view of a cover system 400 with a latching mechanism 430 in a locked position, in accordance with various embodiments. FIG. 4C is an exploded view of the cover system 400 with the latching mechanism 430 from FIGS. 4A and 4B. The cover system 400 may be similar to the cover system 102 shown in FIG. 1 and/or the cover system 200 shown in FIG. 2.

The cover system 400 might include a cover 402, a side rail 404 having a first connection plate 406 disengageably couple to and extending from the side rail 404, a second connection plate 408, and an optional clamp 454. The cover 402 might cover a bed of a truck and protect the bed of the truck. The cover 402 might include a connector 410 attached to the cover 402. The connector 410 might include a first prong 412, a second prong 414, and a gap 416 extending over first prong 412. The side rail 404 might be coupled to a side wall 464 of the bed of the truck 458. The side rail 404 might include a first top surface 474, a side surface 476, and a first inner surface 478. The side surface 476 of the side rail 404 might be configured as an angled surface to enhance the stability of the truck cover system 400. The first inner surface 478 of the side rail 404 might be configured substantially in parallel with the side wall 464 of the bed of the truck 458. The first connection plate 406 of the side rail 404 might include a first recess 418 and a second recess 420. The first recess 418 of the first connection plate 406 might be located on a first bottom surface 480 of the first connection plate 406. The second recess 420 might be located on a second top surface 482 of the first connection plate 406. The second connection plate 408 might disengageably couple to the first bottom surface 480 of the first connection plate 406. The second connection plate 408 might include a first protrusion 422, a third recess 424, a second bottom surface 426, and/or a sloped and/or angled end surface 428. The second connection plate might comprise a third top surface 484. The third recess 424 might be located on the third top surface 484 of the second connection plate 408. When the first connection plate 406 and the second connection plate 408 are in an engaged position, the first protrusion 422 of the second connection plate 408 might be positioned within the first recess 418 of the first connection plate 406. In some embodiments, the third top surface 484 of the second connection plate 408 might be angled in order to facilitate the flow of precipitation. The cover 402 might be removably coupled to the second connection plate 408.

The second connection plate 408 might further include one or more first grooves 460 that defines a series of protrusions and recesses. The first grooves 460 might be located on a second inner surface 472 of the second connection plate 408. The second inner surface 472 of the second connection plate 408 might be removably in parallel with the side wall 464 of the bed of the truck 458. The clamp 454 might include a first clamp frame 466 and a second clamp frame 468 that couple together using a fastener 456. The fastener 456 might be a bolt, a screw, and/or the like. In some embodiments, the clamp frames 466, 468 might together form a C-shaped clamp 454. The first clamp frame 466 might include one or more second grooves 462. The second clamp frame 468 might include one or more third grooves 470. The clamp 454 might be configured to removably clamp the second inner surface 472 of the second connection plate 408 and the side wall 464 of the truck bed 458 together. For example, the clamp 454 might be removably attached to a portion of the second connection plate 408, such as the second inner surface 472. The clamp 454 might also be removably attached to a portion of the side wall 464 of the truck bed 458.

In some embodiments, the first grooves 460 of the second connection plate 408 might be configured to align and/or mate with the second grooves 462 of the first clamp frame 466. The third grooves 470 might be removably coupled to the side wall 464 of the bed of the truck 458. The first grooves 460 of the second connection plate 408 enable attachment of the second connection plate 408 to the side wall 464 of the truck bed 458 using the clamp 454. The second grooves 462 of the first clamp frame 466 might removably engage with the first grooves 460 of the second connection plate 408. The third grooves 470 of the second clamp frame 468 might removably couple to the side wall 464 of the truck bed 458. According to some embodiments, the first grooves 460, second grooves 462, and/or the third grooves 470 might be of a different size or a same size in order to facilitate orientation and coupling of the clamp frames 466, 468 during installation in various applications. In a non-limiting example, the first grooves 460 and second grooves 462 may be a first size to facilitate orientation and coupling between the second connection plate 408 and the first clamp frame 466 and the third grooves 470 may be a second different size to facilitate orientation and coupling between the second clamp frame 468 and the side wall 464 of the truck bed 458.

In operation, the second connection plate 408 might slidingly engage with and releasably attach to the first connection plate 406. In order to facilitate this connection, the first protrusion 422 of the second connection plate 408 might slidingly engage with and releasably attach to the first recess 418 of the first connection plate 406. In some cases, the first protrusion 422 and the first recess 418 might be T-shaped. In operation, the first grooves 460 of the second connection plate 408 might align with the second grooves 462 of the first clamp frame 466, the fastener 456 might compress the first clamp frame 466 and the second clamp frame 468 together to compressively hold the second connection plate 408 and side rail 404 against the side wall 464 of the truck bed 458.

Additionally, the connector 410 might disengageably and/or removably attach the cover 402 to both the first connection plate 406 of the side rail 404 and the second connection plate 408. When the cover 402 is closed, the first prong 412 might releasably engage with and/or snap into a second recess 420 of the first connection plate 406, the second prong 414 might releasably engage with and/or snap into the third recess 424 of the second connection plate 408, and an upper surface of the connector 410 might deform against the cover 402. In other embodiments, when the cover 402 is closed, an upper surface of the connector 410 might releasably engage with and/or snap into a bottom surface of the cover 402. When the cover 402 is opened, the first prong 412 might snap out of the second recess 420 of the first connection plate 406 and the second prong 414 might snap out of the third recess 424 of the second connection plate 408. In other embodiments, when the cover 402 is opened, the first prong 412 might stay engaged with the recess 420 of the first connection plate 406, the second prong 414 might stay engaged with the third recess 424, and an upper surface of the connector 410 might disengage with a bottom surface of the cover 402. In some cases, the connector 410 might extend along the total length of the cover. The connector 410 might be formed from a flexible material that has the ability to bend with the cover 402. The first prong 412 and the second prong 414 may also be formed from a flexible material that has the ability to deform to releasably engage with and/or snap into the second recess 420 and the third recess 424. The flexible material of the connector 410, the first prong 412, and/or the second prong 414 might include fabric, plastic (e.g., vinyl), rubber, etc. The connector 410 might be configured to block precipitation and reduce the wear-and-tear of the truck cover 402.

In some embodiments, the gap 416 extending over first prong 412 and the first connection plate 408 causes the weight of the cover 402 to be held second connection plate 408. In other words, the force from the cover 408 pushes the second connection plate 408 downward. This causes the second connection plate 408 to distribute the force from the cover 402 to the first connection plate 406 via a pulling force instead of a pushing force. In other words, the second connection plate 408 pulls the first connection plate 408 and the side rail 404 downward. Advantageously, by distributing the force from the cover 402 in this manner, the side rail 404 is more securely held in place against the side wall of the truck bed, and, thus, the optional clamp 454 does not need to exert much force to couple the second connection plate 408 and the side rail 404 to the sidewall 464 of the truck bed 458. The optional clamp 454 merely serves as a backup to couple the side rail 404 to the sidewall 464 of the truck bed 458.

The cover system 400 might further include a latching mechanism 430. The latching mechanism 430 might be located on one side of the truck bed. The latching mechanism 430 might be coupled to the cover 402 and configured to releasably engage with the second connection plate 408. Additionally and/or alternatively, there may be two latching mechanisms 430 located on each side of the truck bed.

The latching mechanism 430 might include a latch housing 432 attached to the cover 402 via a latch attachment 434. The latch housing 432 might have a first open end 436 and a second end 438. The latching mechanism 430 might further include a latch 440 extending through the first open end 436 of the latch housing 432. The latch 440 might be configured to releasably engage with the second bottom surface 426 of the second connection plate 408. The latch 440 might have a sloped and/or angled surface and/or third bottom surface 442.

In some cases, the second end 438 of the latch housing 432 might have a smaller open end than the first open end 436 of the latch housing 432. The latching mechanism 430 might further comprise a cap (not shown) restricting the second end 438 of the latch housing 432. The cap may have an opening that is smaller than the first open end 436 of the latch housing 432.

The latching mechanism 430 might additionally include a plunger 444 attached to the latch 440. The plunger 444 might be attached to the latch 440 via a threaded connection (not shown). A first plunger end 446 might partially extend through an opening of the cap. The anchor element 448 might be attached to the first plunger end 446 of the plunger 444 and might be configured to stop the first plunger end 446 from entering the latch housing 432.

A cord 450 might loop and extend through a slot of the first plunger end 438 and/or anchor element 448. Two ends of the looped cord 450 might be attached together via one or more attachment mechanisms 452.

The latching mechanism 430 might also include a spring (not shown). The spring might be wrapped around the plunger 444. In some cases, a first end of the spring might be attached to the plunger 444. A second end of the spring may be in contact with an interior surface of the second end 438 of the housing 432 and/or an interior surface of the cap.

In operation, in order to open the cover 402, a user of the cover 402 may pull the cord 450 which pulls the plunger 444 further out of the second end 438 of the housing 432 and/or out of the opening of the cap, compresses the spring, and pulls the latch 440 into the open end 436 of the housing 432 causing the latch 440 to disengage with the second bottom surface 426 of the second connection plate 408. FIG. 4B shows the latch 440 in a locked position. In order to close the cover 402, the user of the cover 402 may push the cover 402 down causing the first prong 412 and the second prong 414 of the connector 410 to releasably engage with the second recess 420 of the first connection plate 406 and the third recess 424 of the second connection plate 408, respectively, causing the sloped surface 442 of the latch 440 to slide along the sloped surface 428 of the second connection plate 408, pushing the latch 440 toward the second end 438 of the housing 432, and compressing the spring. Once the sloped surface 442 of the latch 440 clears the sloped surface 428 of the second connection plate 408, the spring uncompresses pushing the latch 440 outward and away from the second end 438 of the housing 432 and enabling the latch 440 to releasably engage with the second bottom surface 426 of the second connection plate 408. FIG. 4A shows the latch 440 in an unlocked position.

The latching mechanism 430 will further be described below with respect to FIGS. 5, 6, and 7 below.

Figure 5:
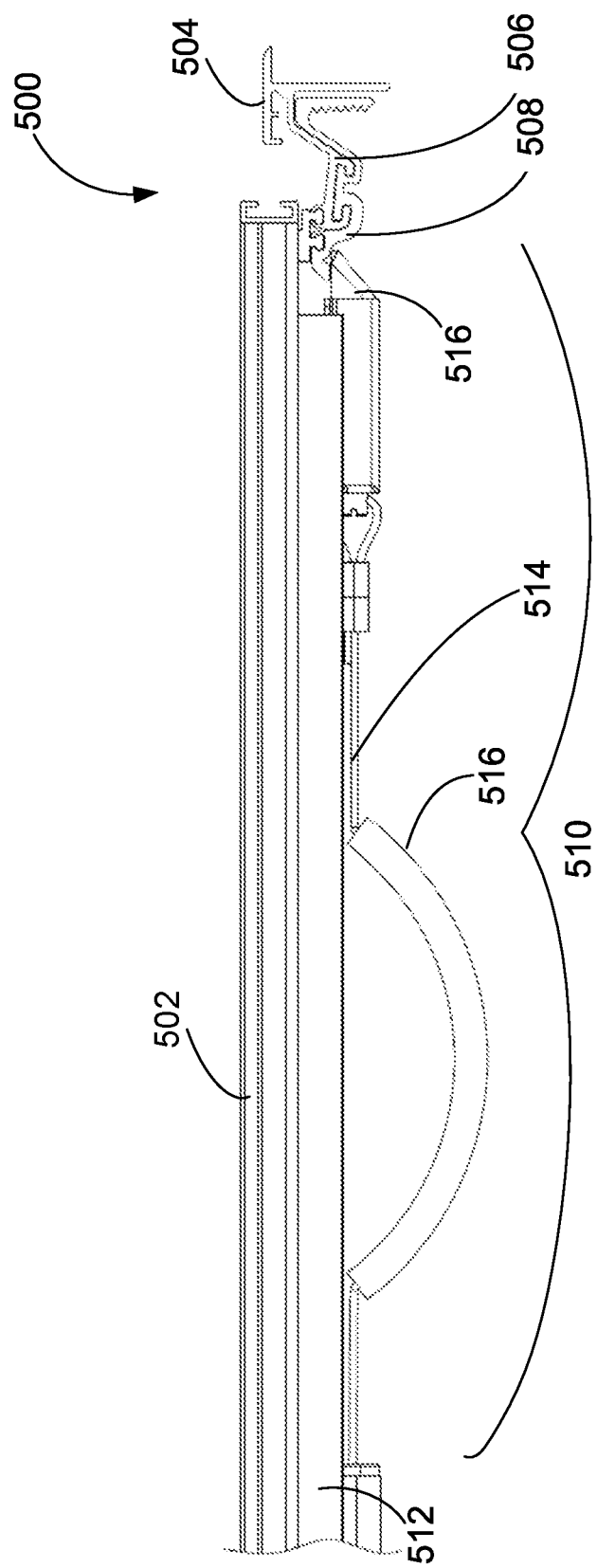
FIG. 5 is a partial front view of a cover system with a latching mechanism from FIG. 4, in accordance with various embodiments.

FIG. 5 is a partial front view of a cover system 500 with a latching mechanism 510 from FIGS. 4A, 4B, and 4C, in accordance with various embodiments. The cover system 500 functions in a similar manner as the cover system 400 from FIG. 4. Additionally and/or alternatively, some of the functionalities described below with respect to FIG. 5 may also be applied to the cover system 300 of FIG. 3.

The cover system 500 might include a cover 502, a side rail 504 having a first connection plate 506, a second connection plate 508 coupled to the first connection plate 506, and a latching mechanism 510 coupled to the cover 502 via a latch attachment 512.

In some cases, the latching mechanism 510 might have a cord 514 attached to a latch 516 of the latching mechanism 510. A first segment of the cord 514 may be threaded through the cover 502 and/or the latch attachment 512. In various embodiments, one or more portions of the first segment of the cord 514 might be looped to form one or more handles 516. In some cases, the one or more portions of the first segment of the cord might extend out of the cover 502 and/or the latch attachment 512 to form the one or more handles 516. The cord 514 may be encased in fabric, plastic, rubber, and/or the like to form the one or more handles. A user might pull the one or more handles 516 to disengage the latch 516 from a bottom surface of the second connection plate 508. In this manner, a user can advantageously disengage the latch 516 from the second connection plate 508 and open the cover 502.

In various instances, the one or more handles 516 are only accessible to a user when a tailgate of the truck is open. Thus, items inside the bed of the truck may be protected from theft because the bed on the truck is only accessible when the tailgate of the truck is opened.

The latching mechanism 510 will further be described below with respect to FIGS. 6 and 7 below.

Figure 6:
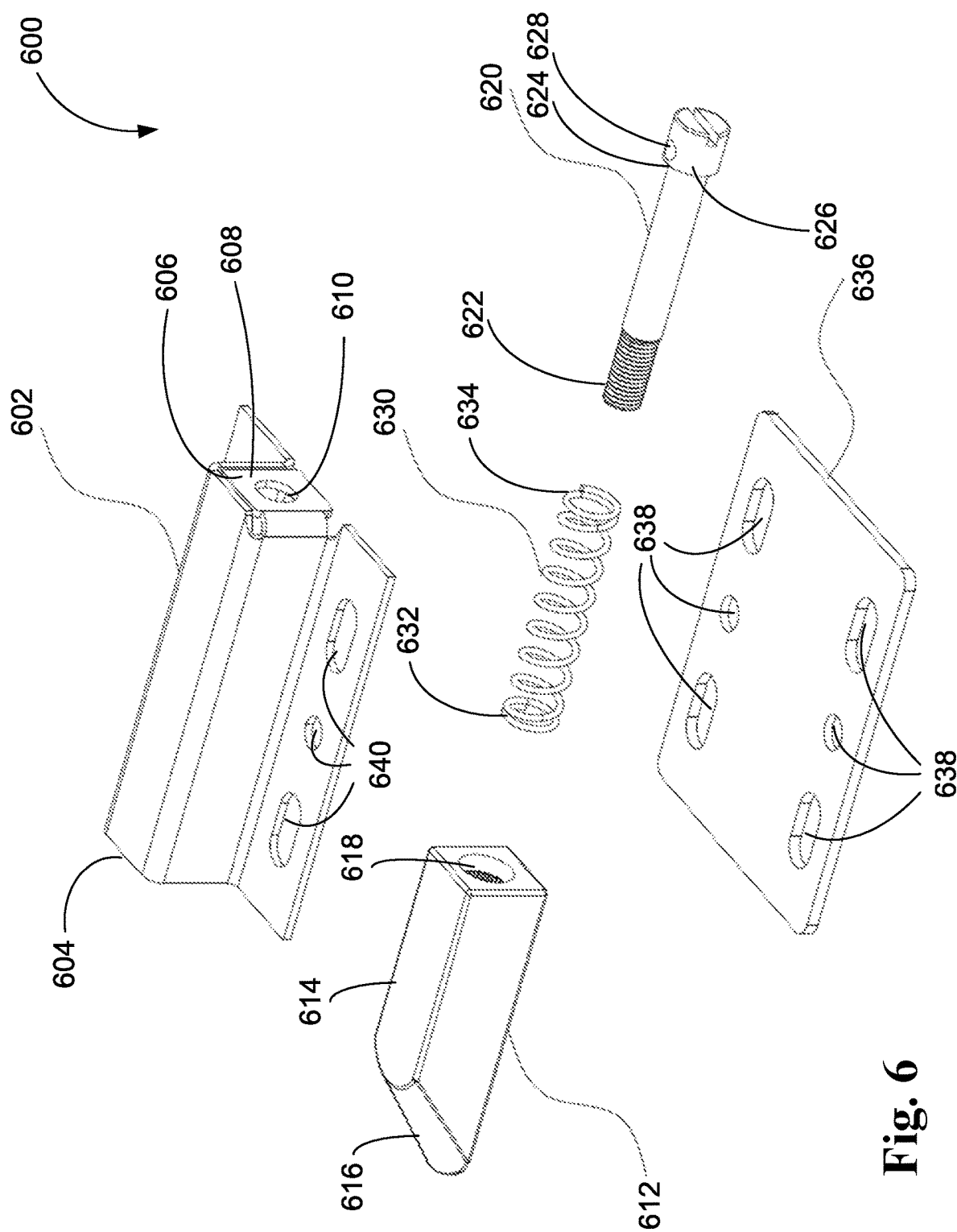
FIG. 6 is an exploded view of a latching mechanism from FIGS. 3, 4, and 5, in accordance with various embodiments.

FIG. 6 is an exploded view of a latching mechanism 600 from FIGS. 3, 4, and 5, in accordance with various embodiments. The latching mechanism 600 may be similar to latching mechanism 314 of FIG. 3, latching mechanism 430 of FIG. 4, and/or latching mechanism 510 of FIG. 5.

The latching mechanism 600 might include a latch housing 602. The latch housing 602 might have a first open end 604 and a second end 606. The first open end 604 may have a square shaped opening. The second end 606 might comprise a cap 608. In some cases, the cap 608 might be machined and be integral with housing 602. In other cases, the cap 608 might be separate from the housing 602. The cap 608 might include an opening 610. The opening 610 may be a circular opening. The second end 606 of the housing 602 might have a smaller open end than the first open end 604 of the housing 602.

The latching mechanism 600 might further include a latch 612 extending through the first open end 604 of the latch housing 602. The latch 612 might be configured to releasably engage with a bottom portion of a side rail of a cover system. The latch 612 might fit snugly within the latch housing 602 and slidingly engage with latch housing 602.

In some instances, the latch 612 might comprise a square shaped portion 614, a sloped and/or angled surface 616, and a circular recess 618. The square shaped portion 614 of the latch 612 might be mostly or fully contained within the latch housing 602. The length of the square shaped portion 614 of the latch 612 may be less than the length of the housing 602. The sloped and/or angled surface 612 might extend from the latch housing 602 and slidingly engage with a sloped surface of a side rail of a cover. Additionally and/or alternatively, a bottom portion (not shown) of the latch 612 might releasably engage with a bottom surface of the side rail when the latch 612 is in a locked position. The circular recess 618 of the latch 612 might comprise one or more threads.

The latching mechanism 600 might additionally include a plunger 620 which may be attached to the latch 612. The plunger 620 might have a first end 622 comprising one or more threads. The first end 622 of the plunger 620 might be inserted into the circular recess 618 of the latch 612 and attached to the latch 612 via a threaded connection.

In some embodiments, the plunger 620 might further include a second plunger end 624. The second plunger end 624 might partially extend through the opening 610 of the cap 608 of the latch housing 602. An anchor element 626 might be attached to the second plunger end 624 of the plunger 620. In some cases, the anchor element 626 might be attached to the first plunger end 624 via a threaded connection. The anchor element 626 might have a circular shape which may be bigger than the circular opening 610 of the cap 608. Thus, the anchor element 626 might be configured to stop or prevent the first plunger end 624 from entering the latch housing 602. The anchor element 626 might further comprise a slot 628. A cord (not shown) might loop and extend through the slot 628 of the anchor element 624.

The latching mechanism 600 might also include a spring 630. The spring 630 might be wrapped around the plunger 620. In some cases, a first end 632 of the spring 630 might be attached to the plunger 620. A second end 634 of the spring 630 may be in contact with an interior surface of the second end 606 of the housing 602 and/or an interior surface of the cap 608.

The latching mechanism 600 might further include a latch attachment 636. The latch attachment 636 might be configured to attach the latch housing 602 to a cover of a truck bed. The latch attachment 636 might comprise one or more openings 638 that are configured to match one or more openings 640 of the latch housing 602. One or more bolts or screws may be inserted through the one or more openings 638 and 640 to couple the latch housing 602 to the latch attachment 636.

In operation, in order to open a cover, the anchor element 626 may be pulled which pulls the plunger 620 further out of the second end 606 of the housing 602 through the opening 610 of the cap 608, compresses the spring 630, and pulls the latch 612 into the open end 604 of the housing 602. This causes the latch 612 to disengage with a bottom surface of a side rail of a cover system. In order to close a cover, the latch 612 may be pushed down, causing the sloped surface 616 of the latch 612 to slide along a sloped surface of a side rail, pushing the latch 612 toward the second end 606 of the housing 602, compressing the spring 630, and pushing the plunger 620 further out of the opening 610 of the cap 608. Once the sloped surface 616 of the latch 612 clears the sloped surface of a side rail, the spring 630 uncompresses pushing the latch 612 outward and away from the second end 606 of the housing 602 and enabling the latch 612 to releasably engage with a bottom surface of the side rail.

The latching mechanism 600 will further be described below with respect to FIG. 7 below.

Figure 7:
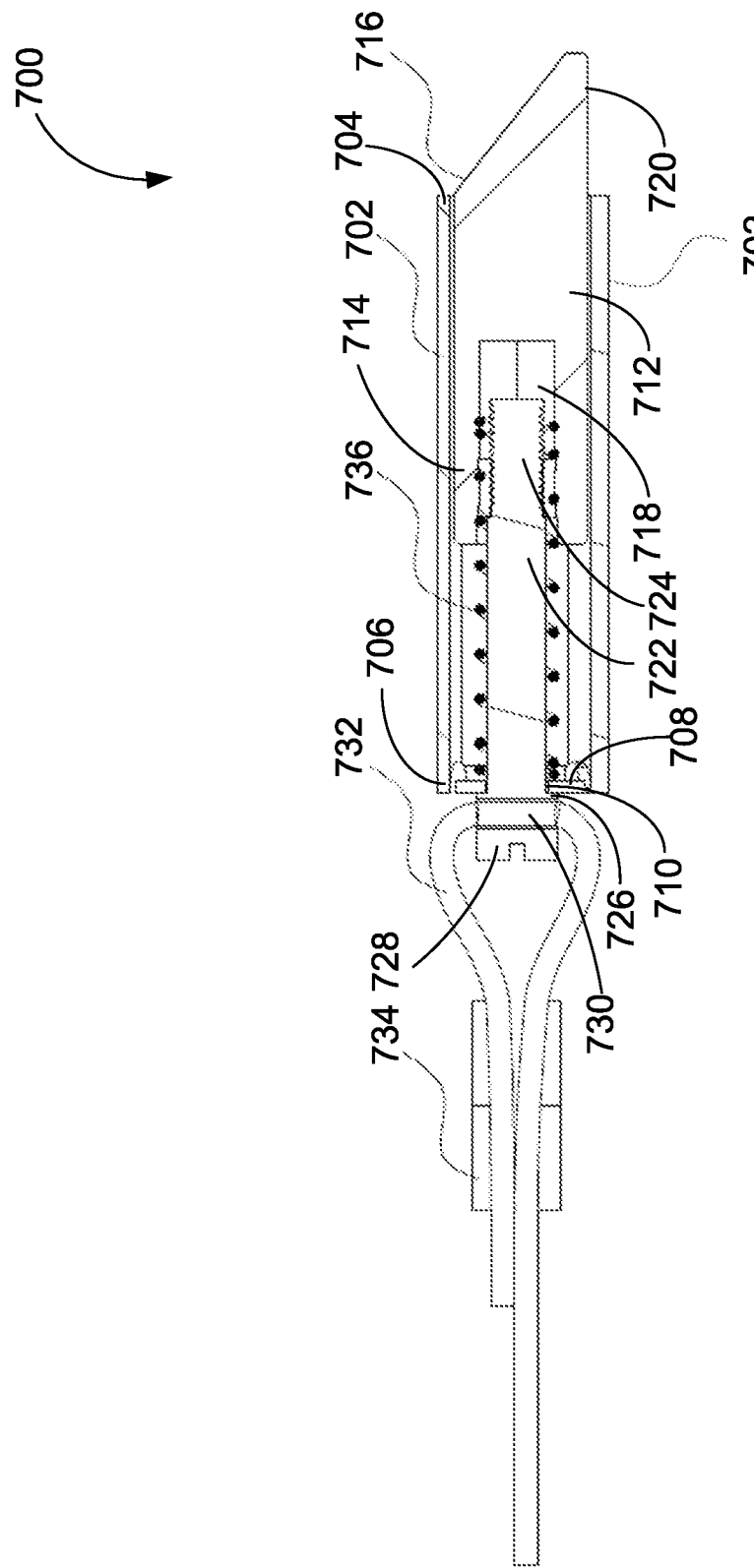
FIG. 7 is a sectional view of an interior of a latching mechanism from FIGS. 3, 4, 5, and 6, in accordance with various embodiments.

FIG. 7 is a sectional view of an interior of a latching mechanism 700 from FIGS. 3, 4, 5, and 6, in accordance with various embodiments. The latching mechanism 700 may be similar to latching mechanism 314 of FIG. 3, latching mechanism 430 of FIG. 4, latching mechanism 510 of FIG. 5, and/or latching mechanism 600 of FIG. 6.

The latching mechanism 700 might include a latch housing 702. The latch housing 702 might have a first open end 704 and a second end 706. The first open end 704 may have a square shaped and/or rectangular shaped opening. The second end 706 might comprise a cap 708. The cap 708 might include an opening 710. The second end 706 of the housing 702 might have a smaller open end than the first open end 704 of the housing 702.

The latching mechanism 700 might further include a latch 712 partially extending through the first open end 704 of the latch housing 702. The latch 712 might be configured to releasably engage with a bottom portion of a side rail of a cover system. The latch 712 might fit snugly within the latch housing 702 and slidingly engage with latch housing 702. In other words, the latch 712 might be configured to slide in and out of the latch housing 702.

In some instances, the latch 712 might comprise a square shaped and/or rectangular shaped portion 714, a sloped and/or angled surface 716, and a circular recess 718. The square shaped portion 614 of the latch 712 might be mostly or fully contained within the latch housing 702. The length of the square shaped portion 714 of the latch 712 may be less than the length of the housing 702. The sloped and/or angled surface 712 might extend from the latch housing 702 and a bottom portion 720 of the latch 712 might releasably engage with a bottom surface of a side rail of a cover when the latch 712 is in a locked position. The circular recess 718 of the latch 712 might comprise one or more threads.

The latching mechanism 700 might additionally include a plunger 722 which may be attached to the latch 712. The plunger 722 might have a first end 724 comprising one or more threads. The first end 724 of the plunger 722 might be inserted into the circular recess 718 of the latch 712 and attached to the latch 712 via a threaded connection.

In some embodiments, the plunger 722 might further include a second plunger end 726. The second plunger end 726 might partially extend through the opening 710 of the cap 708 of the latch housing 702. An anchor element 728 might be attached to the second plunger end 726 of the plunger 722. The anchor element 728 might have a circular shape which may be bigger than the circular opening 710 of the cap 708. Thus, the anchor element 728 might be configured to stop the second plunger end 726 from entering the latch housing 702. The anchor element 728 might further comprise a slot 730.

A cord 732 might loop and extend through the slot 730 of the anchor element 728. Two ends of the looped cord 732 might be attached together via one or more attachment mechanisms 734.

The latching mechanism 700 might also include a spring 736. The spring 736 might be wrapped around the plunger 722. By wrapping the spring 736 around the plunger 722, the spring 736 is less likely to deform and can more easily maintain its shape. In some cases, a first end of the spring 736 might be attached to the first end 724 of the plunger 722. A second end of the spring 736 may be in contact with an interior surface of the second end 706 of the housing 702 and/or an interior surface of the cap 708. When the spring 736 is uncompressed, the force of the spring 736 might cause an interior surface of the anchor element 728 to be in contact with an exterior surface of the second end 706 of the housing 702 and/or an interior surface of the cap 708.

In operation, in order to open a cover, the anchor element 728 may be pulled via the chord 732 which pulls the plunger 722 further out of the second end 706 of the housing 702 through the opening 710 of the cap 708, compresses the spring 736, and pulls the latch 712 into the open end 704 of the housing 702. This causes the latch 712 to disengage with a bottom surface of a side rail of a cover system. In order to close a cover, the latch 712 may be pushed down, causing the sloped surface 716 of the latch 712 to slide along a sloped surface of a side rail, pushing the latch 712 toward the second end 706 of the housing 702, compressing the spring 703, and pushing the plunger 722 further out of the opening 710 of the cap 708. Once the sloped surface 716 of the latch 712 clears the sloped surface of a side rail, the spring 736 uncompresses pushing the latch 712 and plunger 722 outward and away from the second end 706 of the housing 702 and enabling the latch 712 to releasably engage with a bottom surface of the side rail.

Figure 8A:
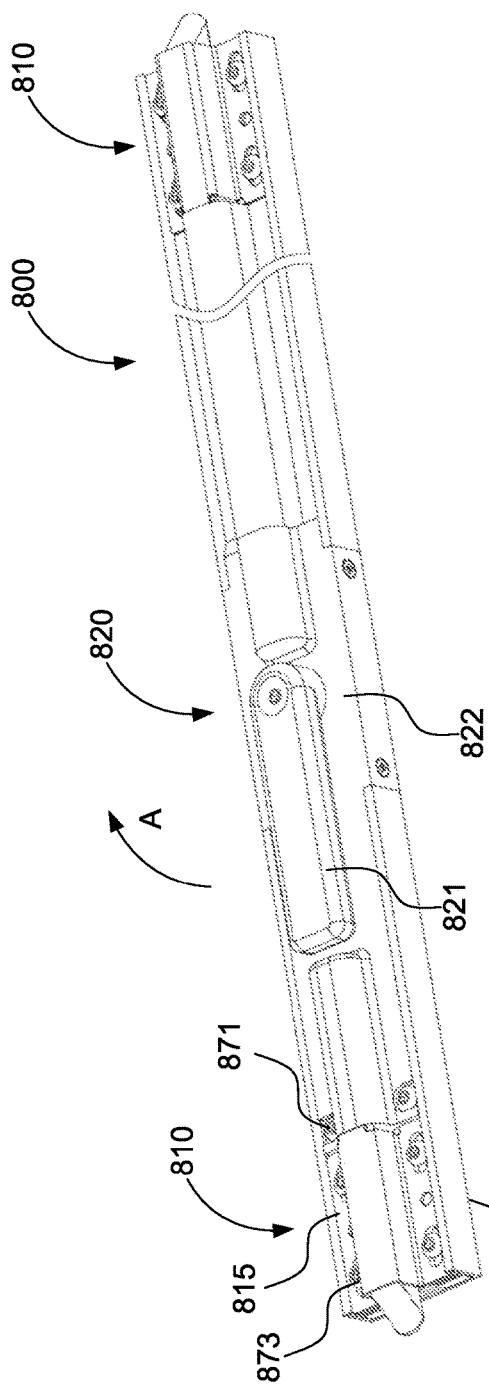
FIGS. 8A and 8B are partial perspective views of a cover system according to some embodiments of the present disclosure.
Figure 8B:
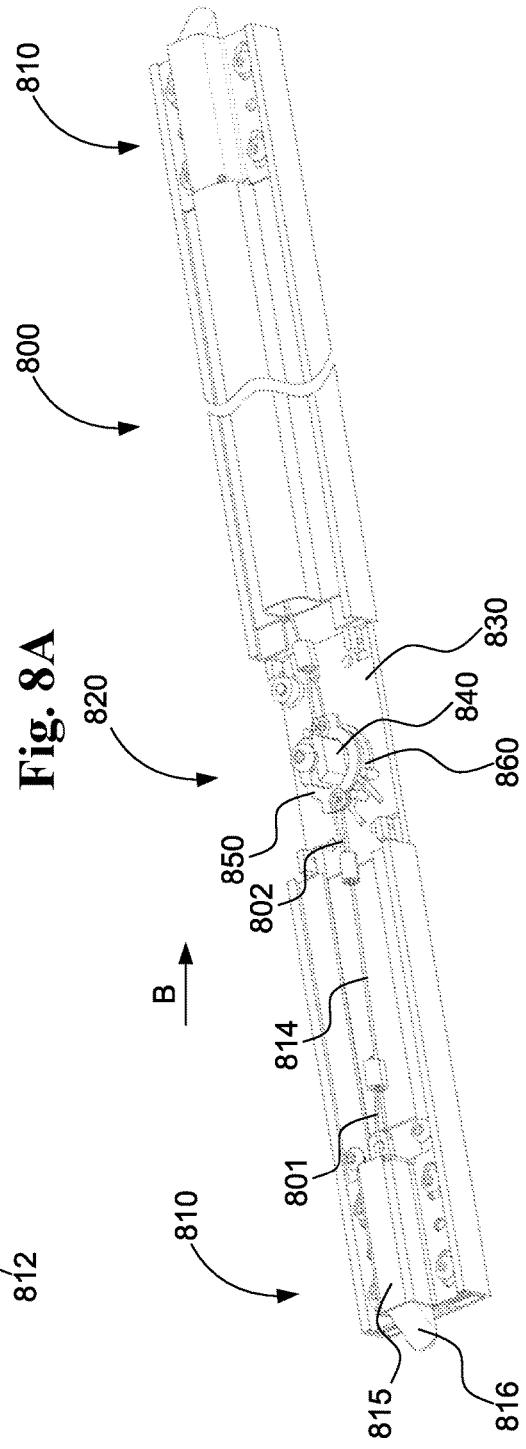

FIGS. 8A and 8B are partial perspective views of a cover system 800 according to some embodiments of the present disclosure. For the purpose of clarity, certain components of cover system 800 has been omitted. As shown in FIG. 8A, in some embodiments, cover system 800 may include a latching mechanism 810 and a driving assembly 820 for driving latching mechanism 810. The cover system 800 functions in a similar manner as the cover system 400 from FIG. 4 or the cover system 500 from FIG. 5. Additionally and/or alternatively, some of the functionalities described below with respect to FIG. 8 may also be applied to the cover system 300 of FIG. 3. In some embodiments, latching mechanism 810 may be similarly embodied as latching mechanism 430 shown in FIG. 4A, latching mechanism 510 shown in FIG. 5, latching mechanism 600 shown in FIG. 6, or latching mechanism 700 shown in FIG. 7.

As discussed above with reference to FIG. 5, similar as cover system 500, cover system 800 may include a side rail (not shown) configured to be coupled to a side wall of a bed of a truck, and a cover (not shown) removably attached to the side rail and configured to cover the bed of the truck. It should be noted that the cover and side rail of cover system 800 could be embodied, for example, as cover 502 and side rail 504 shown in FIG. 5. For example, latching mechanism 810 can be attached to the cover via a latch attachment 812 and configured to releasably engage the side rail. Different from latching mechanism 510 shown in FIG. 5, cover system 800 may include a driving assembly 820 for driving latching mechanism 810. In some embodiments, driving assembly 820 is releasably coupled with latching mechanism 810, as described below. As shown in FIG. 8A, driving assembly 820 may include a handle 821. When it is needed to open the cover, a user may rotate handle 821 in the clockwise direction as shown by arrow A, driving latch 816 of latching mechanism 810 into its housing and out of engagement with the side rail. As the user releases handle 821, latch 816 can extend out of the housing of latching mechanism 810 under the restoration force of a spring (e.g., spring 630) loaded when rotating handle 821.

FIG. 8B similarly shows cover system 800, with cover frame 822 and handle 821 of driving assembly 820 removed to reveal additional components of driving assembly 820. As shown in FIG. 8B, in some embodiments, driving assembly 820 may include a mount plate 830, a driving cylinder 840 rotatably coupled with mount plate 830, a driving ring 850 releasably coupled with driving cylinder 840 and configured to rotate together with driving cylinder 840, and a torsion spring 860 interposed between driving ring 850 and mount plate 830 and configured to be driven by driving ring 850. It should be noted that, although not shown in FIG. 8B, handle 821 is coupled with driving cylinder 840 and configured to rotate together with driving cylinder 840 and driving ring 850, as detailed below. In some embodiments, handle 821 is configured to be immovable relative to driving cylinder 840, and driving ring 850 is configured to be immovable relative to driving cylinder 840 too, when the driving assembly 820 remains in assembled state. That is, as a user rotates handle 821, the subassembly consisting of handle 821, driving cylinder 840, and driving ring 850 can rotate together as an integrated body with respect to mount plate 830. Such a rotation may provide the force for driving latching mechanism 810, as detailed below.

As shown in FIG. 8B, in some embodiments, torsion spring 860 passes through a portion of driving cylinder 840 and is switched between driving ring 850 and mount plate 830. In some embodiments, driving ring 850 is configured to load torsion spring 860 when handle 821 is rotated by the user. After the operation of driving assembly 820 and the user release handle 821, the subassembly consisting of handle 821, driving cylinder 840, and driving ring 850 can return to the rest position as shown in FIG. 8B under the restoration force of the loaded torsion spring 860.

As shown in FIG. 8B, latching mechanism 810 may include a cord 814 attached to latch 816 of latching mechanism 810. In operation, driving cord 814 may provide the force to pull latch 816 out of engagement with the side rail to facilitate the user to open the cover. A detailed description of the operation of a latching mechanism including a cord and a latch may be referred to above description with reference to FIG. 5, FIG. 6, or FIG. 7. As shown in FIG. 8B, a first cord end 801 of cord 814 may be releasably attached to latch 816, while a second end 802 of cord 814 could be releasably attached to driving ring 850 of driving assembly 820. Unlike driving latching mechanism 510 by manually pulling the one or more handles 516 shown in FIG. 5, in some embodiments as shown in FIG. 8B, the rotation of driving ring 850 may provide the force for driving latching mechanism 810. Specifically, when driving ring 850 is driven as handle 821 is rotated, driving ring 850 may pull cord 814 toward the right hand side of FIG. 8B, as shown by arrow B. Then cord 814 may pull latch 816 out of engagement with the side rail of the cover system 800. Similar to latching mechanism 600 shown in FIG. 6, latching mechanism 810 may include a spring (not shown) that may be loaded when latch 816 is pulled out of engagement with the side rail of the cover system 800. For example, latching mechanism 810 may include a spring similar as spring 630 shown in FIG. 6. After handle 821 together with driving ring 850 is released, the restoration force of the loaded spring may push latch 816 out of latch housing 815 of latching mechanism 810.

Figure 9:
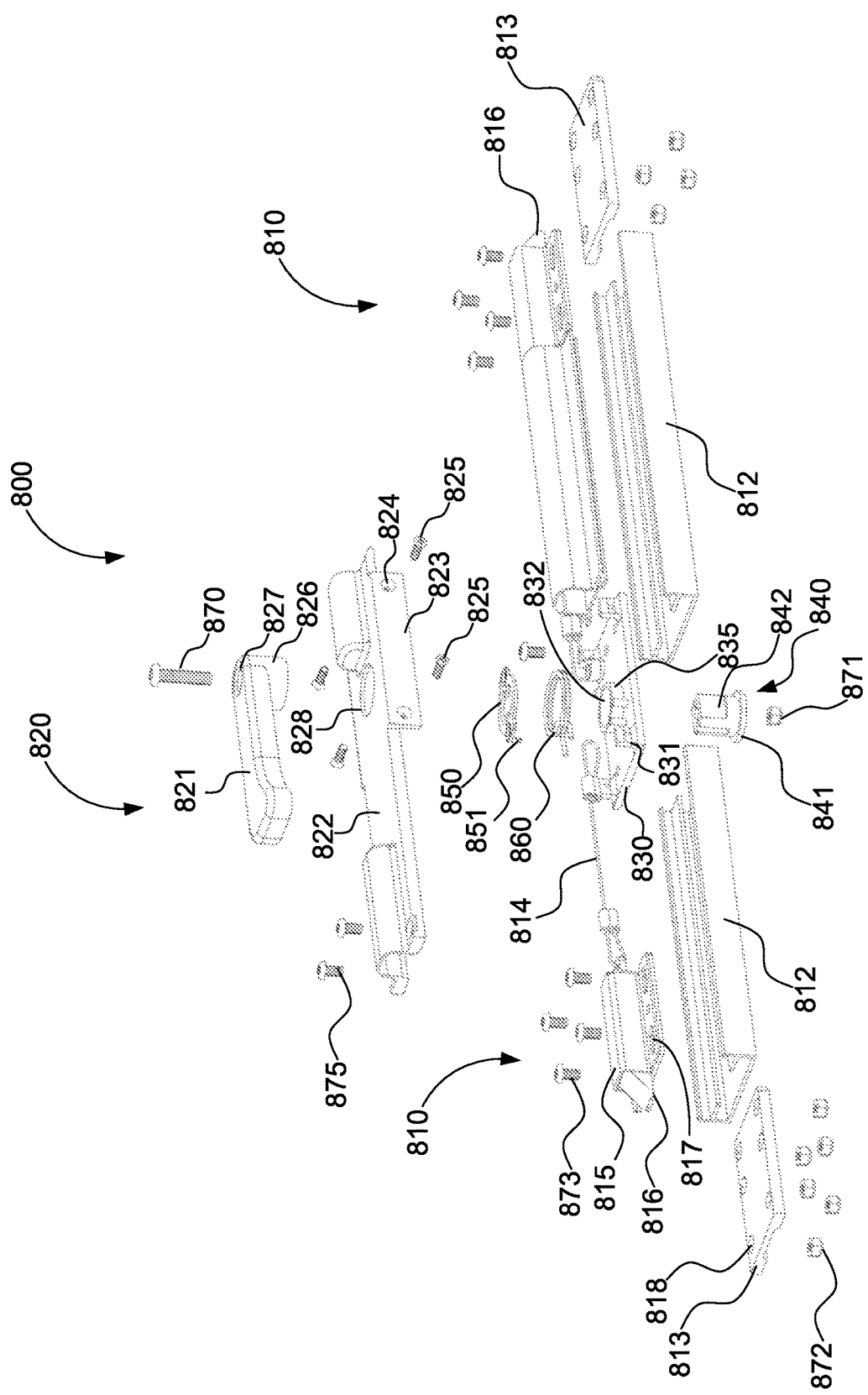
FIG. 9 is an exploded perspective view of cover system in according to some embodiments of the present disclosure.

FIG. 9 is an exploded perspective view of cover system 800 in according to some embodiments of the present disclosure. As shown in FIG. 9, in some embodiments, cover system 800 may include two latching mechanisms 810 disposed on opposite sides of the truck bed. For example, one latching mechanism 810 is configured to engage the left side rail (not shown) of the truck bed, and another one latching mechanism 810 is configured to engage the right side rail (not shown) of the truck bed. For the purpose of conciseness and clarity, the structure of cover system 800 is described by way of one latching mechanism 810 as an example. As shown in FIG. 9, in some embodiments, latching mechanism 810 and driving assembly 820 are coupled through latch attachment 812. An example assembly process of cover system 800 will be described below. As shown in FIG. 9, mount plate 830 may include a central hole 832 surrounded by a flange 835. A cylinder body 842 of driving cylinder 840 passes through central hole 832 of mount plate 830 from the lower side thereof until a flange 841 of driving cylinder 840 rests against the lower surface of mount plate 830.

As shown in FIG. 9, torsion spring 860 pass through flange 835 of mount plate 830 until torsion spring 860 rests against the upper surface of mount plate 830. In some embodiments, driving ring 850 also passes through cylinder body 842 of driving cylinder 840 until driving ring 850 rests against torsion spring 860 with a driving arm 851 of driving ring 850 positioned between the two legs of torsion spring 860. The structure of torsion spring 860 and the interaction between driving ring 850 and torsion spring 860 will be detailed below. Upon in place, driving ring 850 is coupled with cylinder body 842 and cause driving ring 850 cannot rotate with respect to driving cylinder 840. In other words, driving ring 850 can rotate together with driving cylinder 840. The structure of driving cylinder 840 and the interaction between driving ring 850 and driving cylinder 840 will be detailed below.

As shown in FIG. 9, cover frame 822 is then disposed over mount plate 830, with driving ring 850 and torsion spring 860 switched between cover frame 822 and mount plate 830. In some embodiments, cover frame 822 may include side walls 823 on the opposite sides thereof. In some embodiments, side wall 823 may include a plurality of holes 824. In some embodiments, mount plate 830 may include a plurality of stubs 831, each of which include a hole. The number of the plurality of stubs 831 correspond to the number of the holes on the side walls 823. A plurality of screws 825 may pass through the holes 824 in side walls 823 and are threaded into the holes of the plurality of stubs 831 on mount plate 830 to secure the cover frame 822 with mount plate 830. The structure of mount plate 830 and the interaction between mount plate 830 and cover frame 822 will be detailed below.

As shown in FIG. 9, in some embodiments, handle 821 may include a cylinder portion 826 formed at an end thereof and extending perpendicular to the main body of handle 821. A hole 827 is formed through cylinder portion 826. As handle 821 is assembled, cylinder portion 826 is inserted through a hole 828 in cover frame 822 until the distal end of cylinder portion 826 rests against driving ring 850. Then a bolt 870 may sequentially pass through handle 821, cover frame 822, driving ring 850, torsion spring 860, mount plate 830, and driving cylinder 840 to be threaded with nut 871 on the lower side of driving cylinder 840.

As shown in FIG. 9, in some embodiments, latching mechanism 810 and driving assembly 820 are coupled through latch attachment 812. A detailed description of latching mechanism 810 may refer to the above description of latching mechanism 600 with reference to FIG. 6. In some embodiments, latching mechanism 810 may include a latch attachment 813 by which latch housing 815 of latching mechanism 810 is coupled to latch attachment 812. In some embodiments, latch housing 815 include one or more openings 817, and latch attachment 812 may include one or more openings 818. In some embodiments, one or more bolts 873 and nuts 872 could be used to couple latch housing 815 with latch attachment 812 through latch attachment 813. Additionally, one or more bolts 875 and nuts 872 can be used to couple cover frame 822 with latch attachment 812 through one or more openings 818 in latch attachment 813. FIG. 8A also shows the location relationship between latching mechanism 810, cover frame 822, bolts 875, and bolts 873. After assembly of cover system 800, the internal components of latching mechanism 810 and driving assembly 820 could be protected by latch housing 815 of latching mechanism 810 and cover frame 822 of driving assembly 820 from humidity, dirt, and dusts from outside environment. The assembled state of cover system 800 is also shown in FIG. 8A.

Figure 10A:
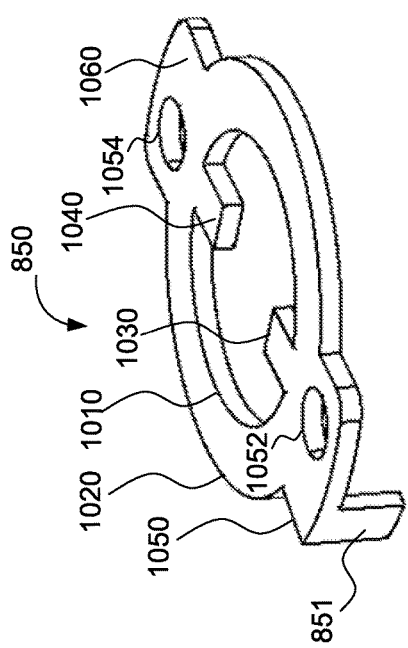
FIG. 10A shows a perspective view of driving ring of driving assembly in accordance with some embodiments of the present disclosure.
Figure 10B:
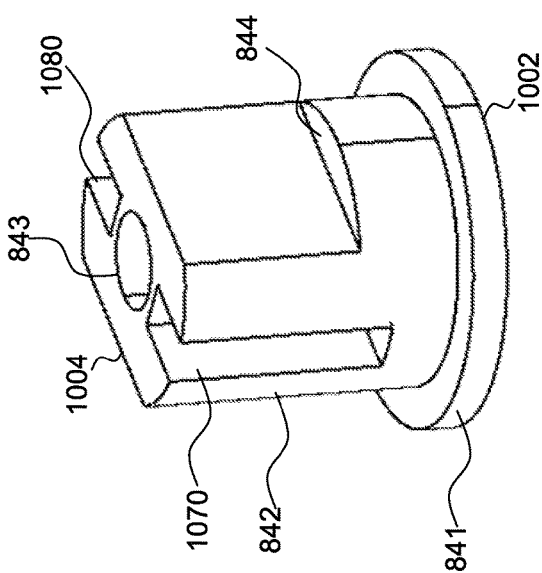
FIG. 10B shows a perspective view of driving cylinder of driving assembly in accordance with some embodiments of the present disclosure.

FIG. 10A shows a perspective view of driving ring 850 of driving assembly 820 in accordance with some embodiments of the present disclosure. FIG. 10B shows a perspective view of driving cylinder 840 of driving assembly 820 in accordance with some embodiments of the present disclosure. As shown in FIG. 10A, driving ring 850 may be formed as a substantially ring shape with inner rim 1010 and outer rim 1020. In some embodiments, driving ring 850 substantially extends in a main plane, for example, a horizontal plane. In some embodiments, driving ring 850 may drive one latching mechanism 810. In some embodiments, driving ring 850 may drive two latching mechanisms 810 as shown in FIG. 8B and FIG. 9. In the instance that one latching mechanism 810 is driven, driving ring 850 may include a first tab 1030 extending radially inwards from inner rim 1010 of driving ring 850. In the instance that two latching mechanisms 810 are driving, driving ring 850 may include a first tab 1030 and a second tab 1040 diametrically disposed in inner rim 1010 around driving ring 850. In some embodiments, first and second tabs 1030 and 1040 can be configured to engage driving cylinder 840 (shown in FIG. 10B) to make driving ring 850 and driving cylinder 840 rotate together for driving latching mechanisms 810 (shown in FIG. 9).

As shown in FIG. 10A, driving ring 850 may include a first ear 1050 extending radially outwards from outer rim 1020 of driving ring 850. In some embodiments, driving ring 850 may include a second ear 1060 extending radially outwards from outer rim 1020 of driving ring 850. In some embodiments, first ear 1050 and second ear 1060 may be diametrically disposed on outer rim 1020 around driving ring 850. In some embodiments, first ear 1050 and first tab 1030 may be disposed peripherally at the substantially same orientation. At the same time, second ear 1060 and second tab 1040 may be dispose peripherally at the substantially same orientation. However, it should be noted that it is not necessary that the first and ears 1050 and 1060 and first and second tabs 1030 and 1040 to be peripherally disposed at corresponding positions. In some embodiments not shown, first ear 1050 and second ear 1060 could be peripherally separated from first and second tabs 1030 and 1040.

As shown in FIG. 10A, in some embodiments, driving ring 850 may include a driving arm 851 extending perpendicular from the main plane of driving ring 850. In some embodiments, driving arm 851 extend from first ear 1050. In some embodiments, driving arm 851 is configured to load torsion spring 860 (shown in FIG. 9) as driving ring 850 drives latching mechanism 810 (shown in FIG. 9). After driving ring 850 is released, the restoration force of torsion spring 860 (shown in FIG. 9) can return driving ring 850 to the rest position or initial position where torsion spring 860 (shown in FIG. 9) is not substantially loaded. The interaction between driving ring 850 and torsion spring 860 will be detailed below.

As shown in FIG. 10A, a hole 1052 is formed through first ear 1050 of driving ring 850. In some embodiments, second end 802 of cord 814 (shown in FIG. 8B) can be attached to hole 1052 in order for driving ring 850 to drive latching mechanism 810 as shown in FIG. 8B. In some embodiments, driving ring 850 may include a gasket 1056 (shown in FIG. 11) disposed in hole 1052 to prevent abrasion of driving ring 850 at hole 1052. Similarly, another hole 1054 is disposed through second ear 1060 of driving ring 850. In some embodiments that drive two latching mechanisms 810, second end 802 of another cord 814 (shown in FIG. 8B) can be attached to the hole 1054 in order for driving ring 850 to drive another latching mechanism 810 as shown in FIG. 8B. Similarly, driving ring 850 may include a gasket 1058 (shown in FIG. 11) disposed in hole 1054 to prevent abrasion of driving ring 850 at hole 1054.

As shown in FIG. 10B, in some embodiments, driving cylinder 840 may include flange 841 at a first end 1002 thereof and cylinder body 842 extending longitudinally from flange 841. In some embodiments, cylinder body 842 may include a first slot 1070 extending longitudinally in cylinder body 842 from a second end 1004 of driving cylinder 840.

In some embodiments, first tab 1030 of driving ring 850 (shown in FIG. 10A) is received within first slot 1070 in order for driving ring 850 and driving cylinder 840 to rotate together. For this purpose, the width of first slot 1070 is equal or slightly greater than the width of first tab 1030 in driving ring 850. In some instance for driving two mechanisms 810, driving cylinder 840 may include a second slot 1080 extending longitudinally in cylinder body 842 from second end 1004 of driving cylinder 840. In some embodiments, first slot 1070 and second slot 1080 may be diametrically disposed around the peripheral of cylinder body 842 of driving cylinder 840. As shown in FIG. 10B, driving cylinder 840 may include a shoulder 844 formed in cylinder body 842 of driving cylinder 840. In some embodiments, driving cylinder 840 may include another shoulder (not shown) diametrically disposed in cylinder body 842 from shoulder 1072. As shown in FIG. 10B, driving cylinder 840 may include a central hole 843 for receiving bolt 870 (shown in FIG. 9) to assemble driving assembly 820.

Figure 11:
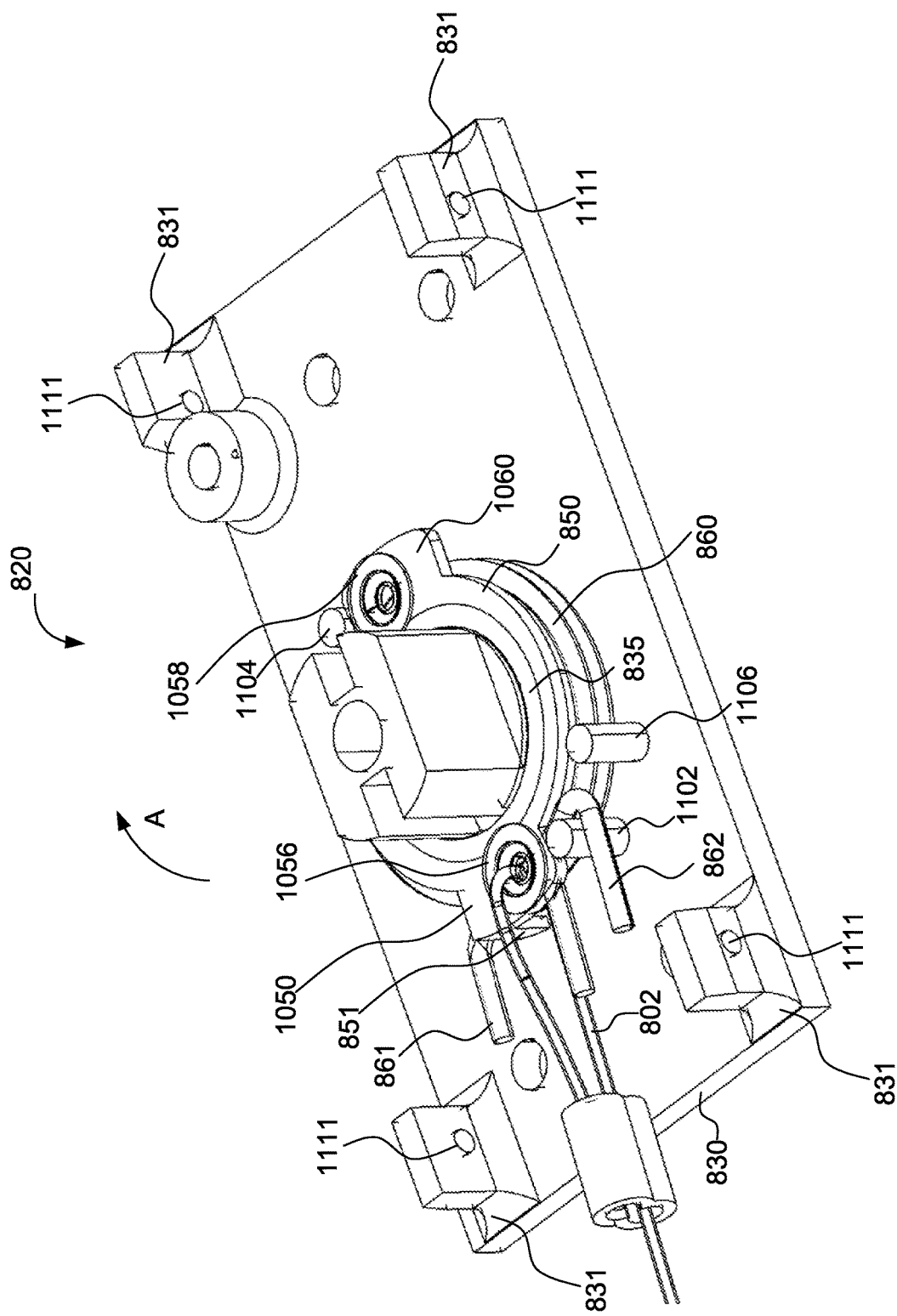
FIG. 11 is a partial perspective view of driving assembly in accordance with some embodiments of the present disclosure, showing the interactions between the mount plate, the driving cylinder, the driving ring, and the torsion spring.

FIG. 11 is a partial perspective view of driving assembly 820 in accordance with some embodiments of the present disclosure, showing the interactions between mount plate 830, driving cylinder 840, driving ring 850, and torsion spring 860. In some embodiments, mount plate 830 may include a substantially rectangle shape. As shown in FIG. 11, mount plate 830 may include a flange 835 located substantially at the center of mount plate 830, extending perpendicular to the mount plate 830 from the upper side. In some embodiments, torsion spring 860 may be positioned surrounding flange 835. In this case, flange 835 may provide support for torsion spring 860 and hold torsion spring 860 in position on mount plate 830 in order for torsion spring 860 to be twisted around flange 835. In some embodiments, driving ring 850 may be positioned on flange 835 instead of supported by torsion spring 860. In this case, driving ring 850 may not affect the torsion of torsion spring 860. As shown in FIG. 11, mount plate 830 may include a location pin 1102 disposed around the flange 835. In some embodiments, torsion spring 860 may include a first leg 861 and a second leg 862. As driving assembly 820 is assembled, location pin 1102 of mount plate 830 and driving arm 851 of driving ring 850 are both positioned between first leg 861 and second leg 862 of torsion spring 860. As shown in FIG. 11, second leg 862 of torsion spring 860 is pressed against location pin 1102 of mount plate 830, while first leg 861 of torsion spring 860 is pressed against driving arm 851 of driving ring 850. As driving assembly 820 is operated, driving arm 851 of driving ring 850 may drive first leg 861 of torsion spring 860 peripherally further from second leg 862 of torsion spring 860 in order to load torsion spring 860.

As shown in FIG. 11, in some embodiments, mount plate 830 may include a first stop pin 1104 disposed around flange 835 of mount plate 830. The first stop pin 1104 may limit the angle rotated by driving ring 850 around flange 835 of mount plate 830 when driving assembly 820 is operated. For example, driving ring 850 may be driven to rotate to such an angle that make first ear 1050 contact first stop pin 1104. In the instance that driving assembly 820 is designed to drive two latching mechanisms 810, as shown in FIG. 9, mount plate 830 may further include a second stop pin 1106 disposed around flange 835 of mount plate 830. In some embodiments, second stop pin 1106 is diametrically disposed around flange 835 from first stop pin 1104. Such a configuration may make sure the angles rotated by first ear 1050 and second ear 1060 around flange 835 of mount plate 830 to be equal with each other. For example, when driving ring 850 is driven around a clockwise direction, shown by arrow A, to such an angle that first ear 1050 contacts first stop pin 1104 while second ear 1060 contacts second stop pin 1106.

As shown in FIG. 11, in some embodiments, mount plate 830 may include a plurality of stubs 831. For example, FIG. 11 shows that mount plate 830 includes four stubs 831 disposed at four corners of mount plate 830. As shown in FIG. 11, each stub 831 may include a hole 1111 disposed along the thickness of stub 831. As described above with reference to FIG. 9, screws 825 (shown in FIG. 9) may pass through holes 824 in side walls 823 of cover frame 822 (shown in FIG. 9) and may be threaded into hole 1111 to secure mount plate 830 with cover frame 822 of driving assembly 820 (shown in FIG. 9).

Figure 12:
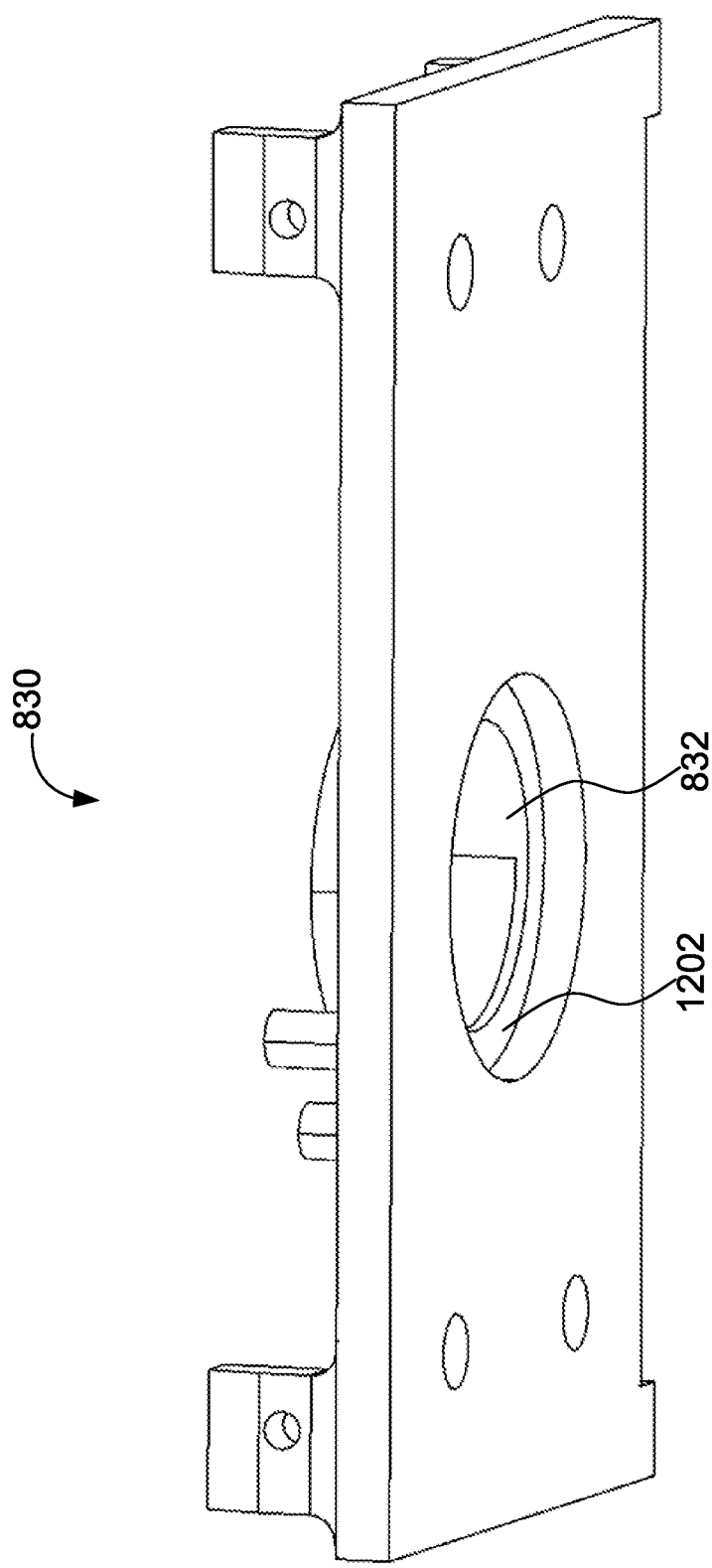
FIG. 12 is a perspective of mount plate of driving assembly in accordance with some embodiments of the present disclosure, showing the lower side of mount plate.

FIG. 12 is a perspective of mount plate 830 of driving assembly 820 in accordance with some embodiments of the present disclosure, showing the lower side of mount plate 830. As shown in FIG. 12, mount plate 330 may include a recess 1202 surrounding central hole 832 (also shown in FIG. 9). As driving assembly 820 is assembled, flange 841 of driving cylinder 840 may be received in recess 1202 to make the lower side of mount plate 830 remain flat.

Figure 13:
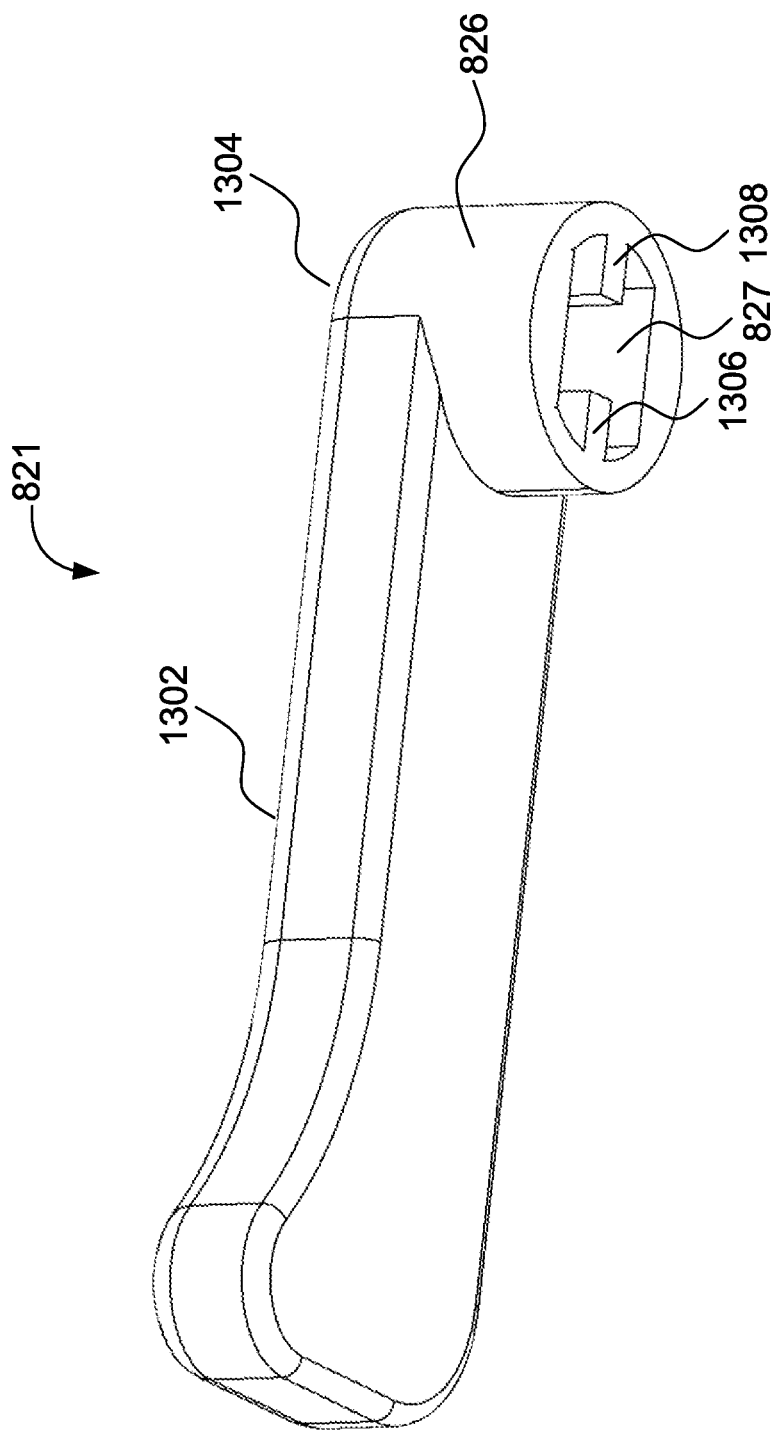
FIG. 13 is a perspective view of handle of driving assembly in accordance with some embodiments of the present disclosure.

FIG. 13 is a perspective view of handle 821 of driving assembly 820 in accordance with some embodiments of the present disclosure. As shown in FIG. 13, in some embodiments, handle 821 include cylinder portion 826 extending perpendicular to the main body 1302 of handle 821 at a first end 1304 of handle 821. A hole 827 is formed through cylinder portion 826. As handle 821 is assembled, cylinder portion 826 is inserted through hole 828 in cover frame 822 until the lower end of cylinder portion 826 rests against driving ring 850 (shown in FIG. 9). As shown in FIG. 13, in some embodiments, handle 821 may include a first protrusion 1306 formed longitudinally in hole 827 in cylinder portion 826 of handle 821. As driving assembly 820 is assembled, first protrusion 1306 may engage with first slot 1070 of driving cylinder 840 (shown in FIG. 10B) to make sure driving force applied by a user on handle 821 may be transferred to driving cylinder 840 through the engagement between first protrusion 1306 and first slot 1070 of driving cylinder (shown in FIG. 10B). In some embodiments, handle 821 may additionally include a second protrusion 1308 formed longitudinally in hole 827 in cylinder portion 826 of handle 821. As shown in FIG. 13, second protrusion 1308 is diametrically disposed in hole 827 from first protrusion 1306. In some embodiments, second protrusion 1308 may engage with second slot 1080 of driving cylinder 840 (shown in FIG. 10B).

Figure 14:
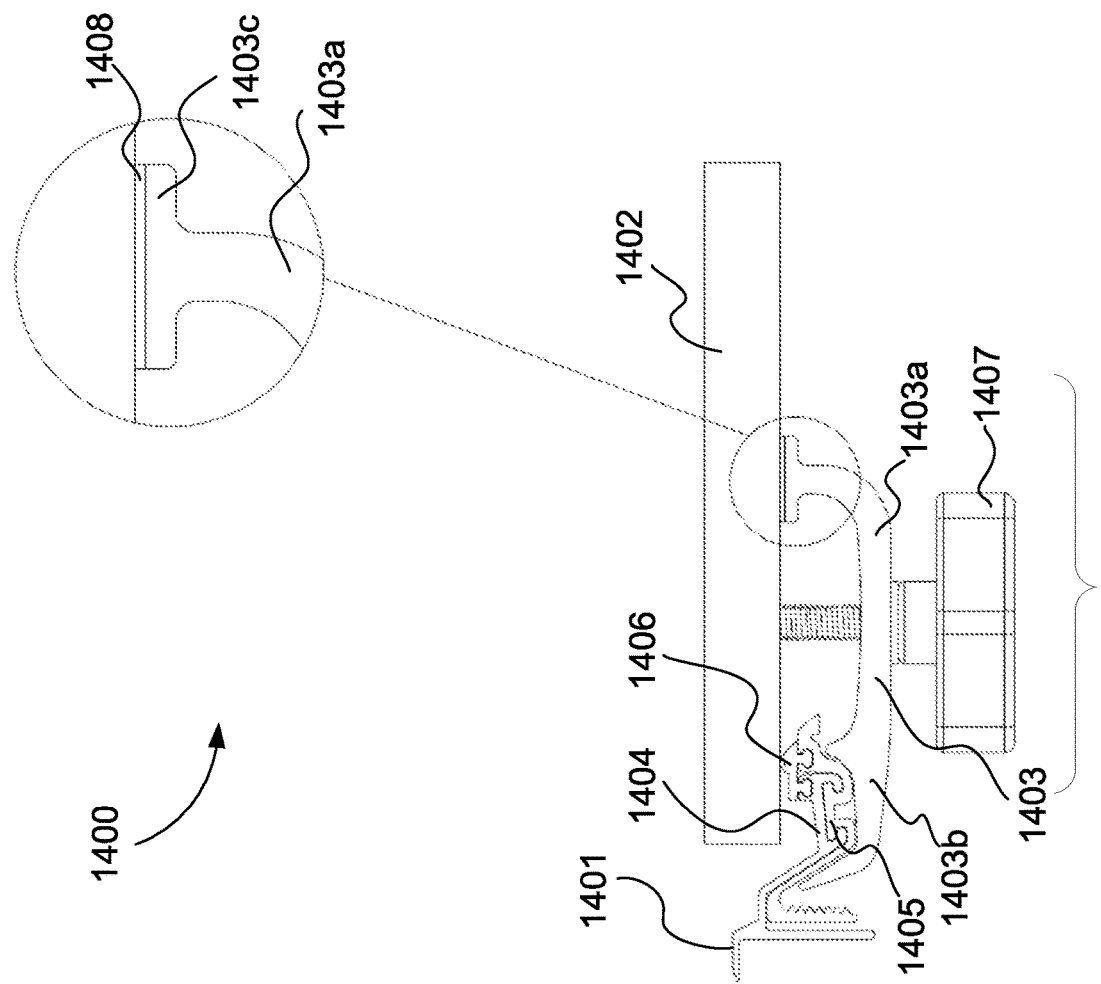
FIG. 14 is a partial perspective view of a cover system with a mounting mechanism in accordance with some embodiments of the present disclosure.

FIG. 14 is a partial perspective view of a cover system with a mounting mechanism in accordance with some embodiments of the present disclosure. This diagram is merely an example, which should not unduly limit the scope of the claims. One of ordinary skill in the art would recognize many variations, alternatives, and modifications.

The cover system 1400 might include a cover 1402, a side rail 1401 having a first connection plate 1404, a second connection plate 1405 coupled to the first connection plate 1404. For instance, side rail 1401 may be symmetrically arranged on both sides of cover 1402. In some embodiments, cover system 1400 further includes a connector 1406 coupled between first connection plate 1404/second connection plate 1406 and cover 1402. Connector 1406 might extend along the total length of cover 1402. The connector 1406 might be formed from a flexible material that has the ability to bend with the cover 1402. For example, the flexible material of the connector 1406 might include fabric, plastic (e.g., vinyl), rubber, etc. The connector 1406 might be configured to block precipitation and reduce the wear-and-tear of cover 1402.

The cover system 1400 may further include a mounting mechanism 1410, which includes a supporting member 1403 and a clamping member 1407. Clamping member 1407 may be configured to pass through the supporting member 1403 and connect to cover 1402. In various embodiments, supporting member 1403 includes a first supporting portion 1403*a* and a second supporting portion 1403*b*. First supporting portion 1403*a* may be configured to support a bottom of cover 1402. Second supporting portion 1403*b* may be configured to provide support for side rail 1401 (e.g., second connection plate 1405). Supporting member 1403 may extend upwardly and further include an abutting portion 1403*c* coupled to the first supporting portion 1403*a*. Abutting portion 1403*c* is configured to be removably coupled to the bottom of cover 1402. For example, clamping member 1407 is configured to drive the supporting member 1403 to clamp side rail 1401 (e.g., second connection plate 1405) onto cover 1402 such that abutting portion 1403*c* can abut against the bottom of cover 1402. In some cases, a cushion member 1408 may be coupled between abutting portion 1403*c* and cover 1402 to reduce the wear-and-tear of cover 1402. For instance, cushion member 1408 may include a flexible material (e.g., fabric, plastic, rubber, and/or the like).

The mounting mechanism 1410 will further be described below with respect to FIG. 15 below.

Figure 15:
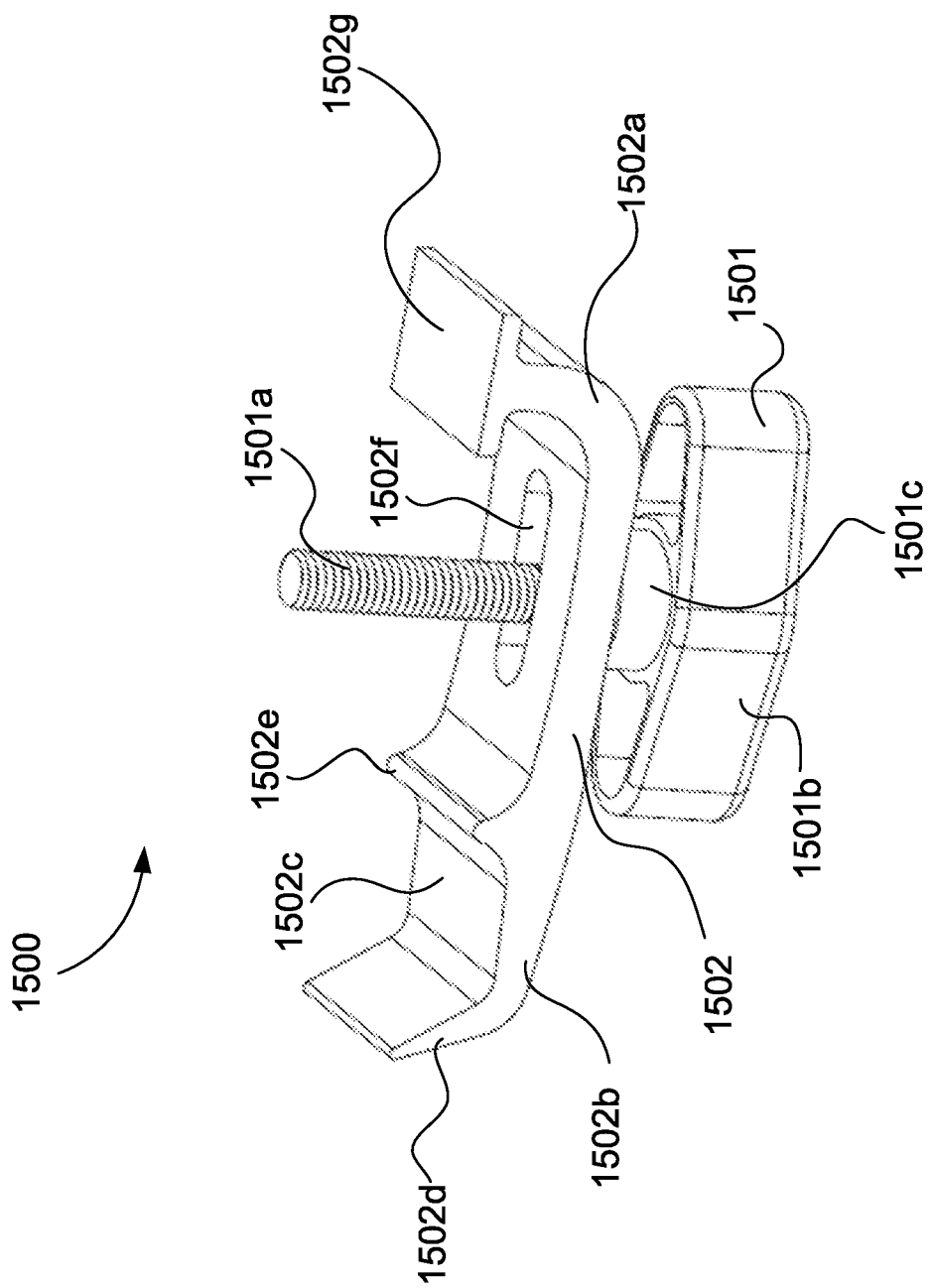
FIG. 15 is a perspective view of a mounting mechanism of a cover system in accordance with some embodiments of the present disclosure.

FIG. 15 is a perspective view of a mounting mechanism of a cover system in accordance with some embodiments of the present disclosure. This diagram is merely an example, which should not unduly limit the scope of the claims. One of ordinary skill in the art would recognize many variations, alternatives, and modifications.

As shown, mounting mechanism 1500 includes a clamping member 1501 and a supporting member 1502. For example, supporting member 1502 includes a first supporting portion 1502*a* and a second supporting portion 1502*b*. First supporting portion 1502*a* may extend upwardly and form an abutting portion 1502*g* configured to couple to and provide support to the cover. Second supporting portion 1502*b* may extend upwardly and form a first protrusion 1502*d* and a second protrusion 1502*e* and a groove 1502*c* positioned in between. For instance, first protrusion 1502*d* and second protrusion 1502*e* are configured to match an outer contour of the second connection plate (e.g., second connection plate 1405 of FIG. 14), allowing for a larger supporting area to ensure stable engagement between supporting member 1502 and the side rail (e.g., side rail 1401 of FIG. 14).

In various implementations, clamping member 1501 is configured to removably engage the side rail with the cover by driving the supporting member 1502 to clamp the side rail onto the cover. For instance, supporting member 1502 further includes a slot 1502*f* that allows clamping member 1501 to pass therethrough to connect to the cover. The slot 1502*f* may be configured along the width or length direction of supporting member 1502 for adjusting the position of the clamping member 1501, which results in flexibility in adjusting the force point to achieve steady support. By simply adjusting the position of the clamping member 1501, the force point can be shifted and adjusted accordingly, making it easier to achieve steady support for the object being clamped (e.g., the side rail) as well as ensure precision and accuracy in the clamping process. With this level of adjustability, the user can have greater control and flexibility in choosing the optimal position for the clamping member, allowing them to achieve the desired level of stability and support for the cover.

In some embodiments, clamping member 1501 includes a screw 1501*a* and a knob 1501*b* connected to screw 1501*a*. In some cases, a washer 1501*c* may be positioned between supporting member 1502 and knob 1501*b*. The supporting member 1502 may be provided with a through-hole for screw 1501*a* to pass through and the cover may be provided with a threaded hole (not shown) to match with the screw 1501*a* for fixation.

Figure 16:
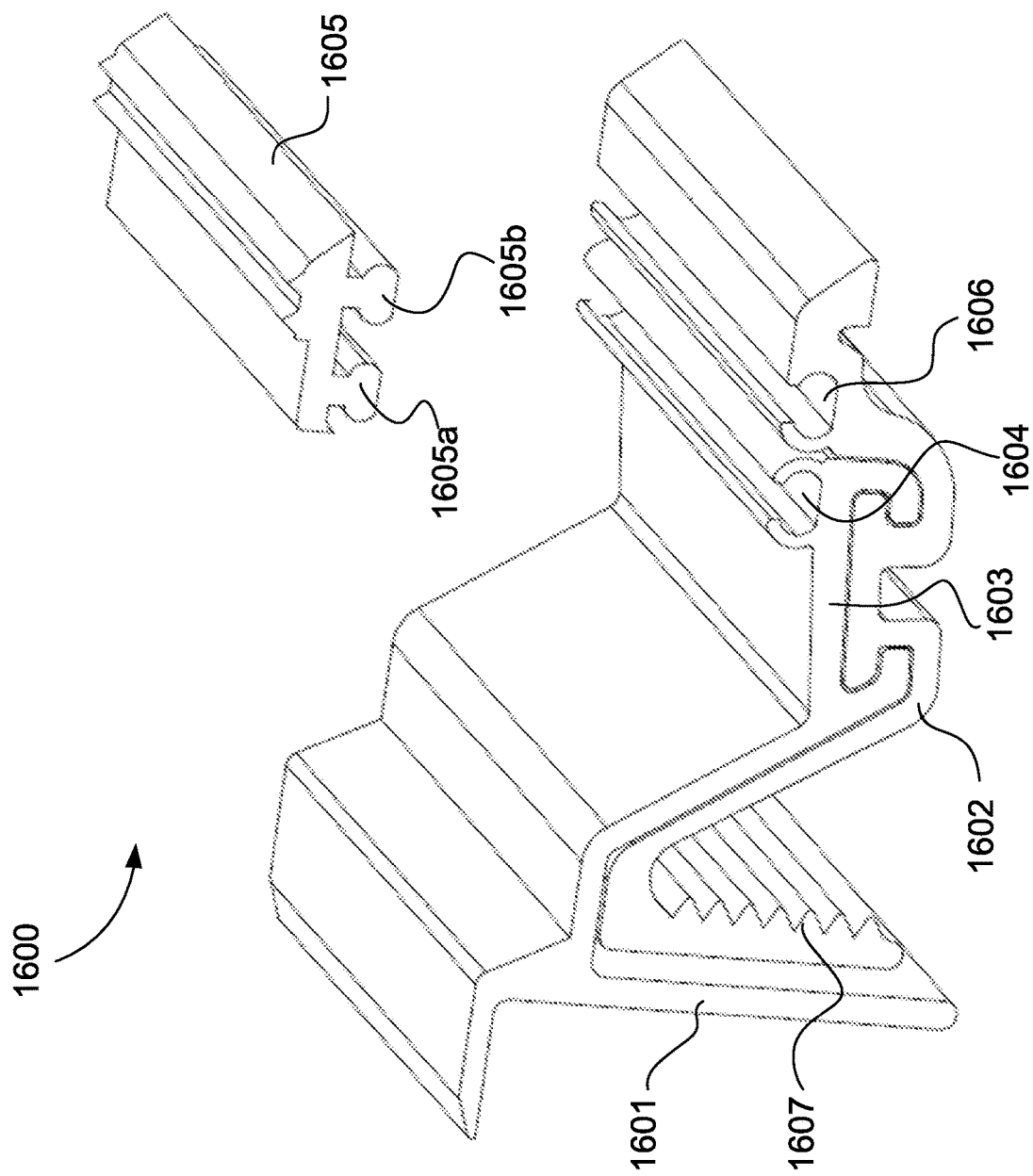
FIG. 16 is a partial perspective view of a cover system with a mounting mechanism in accordance with some embodiments of the present disclosure.

FIG. 16 is a partial perspective view of a cover system with a mounting mechanism in accordance with some embodiments of the present disclosure. This diagram is merely an example, which should not unduly limit the scope of the claims. One of ordinary skill in the art would recognize many variations, alternatives, and modifications.

As shown, cover system 1600 includes a side rail 1601 having a first connection plate 1603 extending from the side rail 1601, and a second connection plate 1602. The second connection plate 1602 may be configured to slidingly engage with and releasably attach to the first connection plate 1603. The side rail 1601 might include a connector 1605 attached to the side rail 1601. The connector 1605 might include a first prong 1605*a* and a second prong 1605*b*. The first connection plate 1601 might include a first recess 1604. The second connection plate 1602 may include a second recess 1606. The first recess 1604 may removably engage with first prong 1605*a* and the second recess 1606 may removably engage with second prong 1605*b* such that connector 1605 can removably attach to side rail 1601. In some cases, the first prong 1605*a* and the second prong 1605*b* may undergo deformation to respectively engage with first recess 1604 and second recess 1606, which ensures the waterproof effect between side rail 1601 and the cover (not shown).

The second connection plate 1602 might further include one or more first grooves 1607 that define a series of protrusions and recesses. The first grooves 1607 might be located on an inner surface of the second connection plate 1602. The first grooves 1607 may be configured to engage with a clamping mechanism (not shown) such that the second connection plate 1602 can couple to side rail 1601.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A truck cover system, comprising:
a side rail configured to be coupled to a side wall of a bed of a truck;
a cover removably attached to the side rail and configured to cover the bed of the truck;
a latching mechanism attached to the cover and configured to releasably engage the side rail; and
a driving assembly configured to drive the latching mechanism, the driving assembly comprising:
a mount plate coupled with the side rail through a latch attachment;
a driving cylinder rotatably coupled with the mount plate;
a driving ring releasably coupled with the driving cylinder and configured to rotate together with the driving cylinder;
a torsion spring interposed between the driving ring and the mount plate and configured to be driven by the driving ring; and
a handle coupled with the driving cylinder and configured to rotate together with the driving cylinder and the driving ring.

2. The truck cover system of claim 1, wherein the driving assembly further comprises a cover frame coupled with the mount plate and the latch attachment.

3. The truck cover system of claim 1, wherein the driving cylinder comprises a cylinder flange and a cylinder body coupled with the flange, wherein the mount plate comprises a central hole, wherein the cylinder body of the driving cylinder is inserted through the central hole.

4. The truck cover system of claim 3, wherein mount plate further comprises a recess formed in a bottom surface of the mount plate and surrounding the central hole, wherein the flange of the driving cylinder is received within the recess.

5. The truck cover system of claim 3, wherein the mount plate further comprises a mount flange extending perpendicular to the mount plate around the central hole in the mount plate, wherein the torsion spring passes through the mount flange of the mount plate.

6. The truck cover system of claim 3, wherein the driving cylinder comprises a slot formed longitudinally in the cylinder body of the driving cylinder, wherein the driving ring is coupled to the slot.

7. The truck cover system of claim 6, wherein the driving cylinder comprises a shoulder formed in the cylinder body.

8. The truck cover system of claim 6, wherein the driving ring comprises a tab extending radially inwards from an inner rim of the driving ring, wherein the tab is received within the slot of the driving cylinder.

9. The truck cover system of claim 3, wherein the driving cylinder comprises a first slot and second slot formed longitudinally in the cylinder body of the driving cylinder, wherein the first slot and the second slot are diametrically formed around the cylinder body, wherein the driving ring is coupled to the first and second slots.

10. The truck cover system of claim 9, wherein the driving ring comprises a first tab and a second tab extending radially inwards from an inner rim of the driving ring, wherein the first tab and the second tab are diametrically formed around the inner rim of the driving ring,
wherein the driving cylinder comprises a first slot and a second slot formed longitudinally in the cylinder body of the driving cylinder, wherein the first slot and the second slot are diametrically formed around the cylinder body,
wherein the first tab is received within the first slot and the second tab is received within the second slot.

11. The truck cover system of claim 1, wherein the driving ring further comprises an ear extending radially outward from an outer rim of the driving ring, wherein the latching mechanism is releasably coupled with the ear of the driving ring.

12. The truck cover system of claim 11, wherein the driving ring further comprises a driving arm coupled with the ear of the driving ring and extending perpendicular to the driving ring, wherein the torsion spring comprises a first leg and a second leg, wherein the driving arm of the driving ring is disposed between the first leg and the second leg of the torsion spring.

13. The truck cover system of claim 12, wherein the mount plate further comprises a location pin extending perpendicular to the mount plate, wherein the location pin is disposed between the first leg and the second leg of the torsion spring.

14. The truck cover system of claim 13, wherein the mount plate further comprises stop pin extending perpendicular to the mount plate, wherein the stop pin is configured to limit an angle rotated by the driving ring.

15. The truck cover system of claim 1, wherein the driving ring further comprises a first ear and a second ear extending radially outward from an outer rim of the driving ring, wherein the first ear and the second ear are formed diametrically around the outer rim of the driving ring, wherein the latching mechanism is releasably coupled with the first ear of the driving ring and another latching mechanism is releasably coupled with the second ear of the driving ring.

16. The truck cover system of claim 15, wherein the driving ring further comprises a driving arm coupled with the first ear of the driving ring and extending perpendicular to the driving ring, wherein the torsion spring comprises a first leg and a second leg, wherein the driving arm of the driving ring is disposed between the first leg and the second leg of the torsion spring.

17. The truck cover system of claim 16, wherein the mount plate further comprises a location pin extending perpendicular to the mount plate, wherein the location pin is disposed between the first leg and the second leg of the torsion spring.

18. The truck cover system of claim 17, wherein the mount plate further comprises a first stop pin and a second stop pin extending perpendicular to the mount plate, wherein the first stop pin and the second stop pin are diametrically disposed around the driving ring, wherein the first stop pin and the second stop pin are configured to limit an angle rotated by the driving ring.

19. The truck cover system of claim 1, wherein the handle comprises a cylinder portion formed at an end thereof and extending perpendicular to a main body of the handle, wherein a distal end of the cylinder portion rests against the driving ring.

20. The truck cover system of claim 19, wherein the handle further comprises a handle hole formed through the cylinder portion of the handle, wherein the handle further comprises a protrusion formed longitudinally in the handle hole, wherein the protrusion is configured to engage with the driving cylinder.

* * * * *